(12) United States Patent
Tochigi

(10) Patent No.: US 7,800,844 B2
(45) Date of Patent: Sep. 21, 2010

(54) FOCUS DETECTION OPTICAL SYSTEM AND IMAGING APPARATUS INCORPORATING THE SAME

(75) Inventor: Akiyoshi Tochigi, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 282 days.

(21) Appl. No.: 12/156,682

(22) Filed: Jun. 3, 2008

(65) Prior Publication Data
US 2009/0003816 A1    Jan. 1, 2009

(30) Foreign Application Priority Data
Jun. 29, 2007   (JP)   ............................... 2007-171486

(51) Int. Cl.
*G02B 9/06*   (2006.01)
*G02B 21/00*  (2006.01)
*G02B 7/28*   (2006.01)

(52) U.S. Cl. ..................... 359/794; 250/201.8; 396/114

(58) Field of Classification Search ................. 359/794; 250/201.8; 396/111, 114
See application file for complete search history.

(56) References Cited
U.S. PATENT DOCUMENTS
4,916,473 A * 4/1990 Mukai et al. ................ 396/114
6,239,912 B1 5/2001 Ozawa FOREIGN PATENT DOCUMENTS
| JP | 60-032012 | 2/1985 |
| JP | 62-079407 | 4/1987 |
| JP | H07-31300 | 4/1995 |
| JP | H08-12321 | 2/1996 |
| JP | 2586089 | 12/1996 |
| JP | 2001-021797 | 1/2001 |
| JP | 2003-075718 | 3/2003 |

\* cited by examiner

*Primary Examiner*—William C Choi
(74) *Attorney, Agent, or Firm*—Kenyon & Kenyon LLP

(57) ABSTRACT

The invention relates to a focus detection optical system for digital single-lens reflex cameras or the like and an imaging apparatus incorporating the same. A pupil division optical system comprises an aperture stop having a pair of openings with an optical axis of said taking lens held between them, and a pair of re-imaging lenses, each consisting of a double-convex lens having a convex entrance-side surface and a convex exit-side surface. When, on a plane passing through the optical axis of the taking lens and the centers of gravity of the openings in the aperture stop, a surface apex is defined by a position of the convex entrance-side surface, and the convex exit-side surface, which position is extended most in a direction parallel with the optical axis of the taking lens, the surface apexes of the entrance-side surface and the exit-side surface of the double-convex lens are positioned away from the optical axis of the taking lens in the same direction, and the distance of the surface apex of the entrance-side surface from the optical axis of the taking lens is larger than the distance of the surface apex of the exit-side surface from the optical axis of the taking lens.

35 Claims, 15 Drawing Sheets

FOCUS DETECTION OPTICAL SYSTEM AND IMAGING APPARATUS INCORPORATING THE SAME

This application claims benefit of Japanese Application No. 2007-171486 filed in Japan on Jun. 29, 2007, the contents of which are incorporated by this reference.

BACKGROUND OF THE INVENTION

The present invention relates generally to a focus detection optical systems for digital single-lens reflex cameras or the like and an imaging apparatus incorporating the same, and more particularly to a focus detection optical system operable to divide the pupil of a taking lens into two pupil areas so that two secondary object images are formed by a light beam passing through each pupil area to detect a relative position relation between two such secondary object images thereby detecting the focus position of the taking lens, and an imaging apparatus incorporating the same.

So far, there is a phase contrast type focus detection optical system available, in which an image (primary image) formed by a taking lens is re-formed into two images on a light receptor element array via a pupil division optical system built up of a condenser lens, a pair of aperture stops and a pair of re-imaging lenses, and the light intensity distributions of two such images are compared for correlative operation to find a spacing between the two lenses, so that the defocus quantity of the primary image formed by the taking lens is obtained.

For instance, let Y0 be the spacing between the two images on the light receptor element array when the taking lens is in focus, and Y1 be the spacing between the two lenses when it is out of focus. The difference $\delta=Y1-Y0$ is correlative to the defocus quantity of the primary image; if this difference $\delta$ is found, focus detection can then be implemented.

The first requirement for such a focus detection optical system is that the two images on the light receptor element array are well correlative to each other. Poor correlations between the two images would lead to a decline of correlative operation precision as their spacing is found, having adverse influences on range-finding precision.

Heretofore, for improvements in range-finding precision or for correction of aberrations, it has been proposed to tweak the re-imaging lenses in particular (for instance, see Patent Publications 1 to 5).

With the focus detection optical system set forth in Patent Publication 1, a re-imaging lens is configured in a plano-convex or double-convex shape and at least one of a condenser lens is configured in an aspheric shape for correction of distortion.

With the focus detection optical system set forth in Patent Publication 2, an auxiliary lens is added to just before a re-imaging lens so that there are a total of two lenses involved, and at least one of a condenser lens is configured in a rotationally oval surface shape for correction of distortion.

With the focus detection optical system set forth in Patent Publication 3, a re-imaging lens is configured in a double-convex shape with varying quantities of decentration of its entrance- and exit-sides surfaces, thereby correcting distortion.

With the focus detection optical system set forth in Patent Publication 4, a re-imaging lens is configured in a double-convex shape with the same quantity of decentration of its entrance- and exit-side surfaces, and the center of an aperture stop is decentered from the re-imaging lens.

And one surface of the re-imaging lens is configured in an aspheric surface shape for correction of field curvature.

With the focus detection optical system set forth in Patent Publication 5, one surface of a re-imaging lens is configured in a spherical surface shape and the other in an inclined surface shape having a prism action for correction of distortion and chromatic aberrations.

On the other hand, there is now a growing demand for a lot wider range capable of focus detection for a taking range and a lot more range-finding points. One possible approach to that is that as many such optical systems as range-finding points are provided as is the case with the prior art focus detection optical system shown in FIG. 19. The prior art of FIG. 19 comprises an imaging device having a light receiving plane adapted to receive an image formed by a taking lens (not shown). And a predetermined imaging plane 1 equivalent to the light receiving plane of the imaging device is formed through an optical path splitter such as a quick return mirror, a half-mirror or the like by reflection of light at an auxiliary mirror located on a side through the quick return mirror. In order from the predetermined imaging plane I toward a light receptor element array E, the prior art further comprises a field mask M placed near the predetermined imaging plane I and having a plurality of apertures corresponding a range-finding area on an optical axis L (equal to the optical axis of the taking lens) and an off-axis range-finding area, a condenser lens member L1 having condenser lenses corresponding to a plurality of range-finding areas, an aperture stop member S having a plurality of pairs of aperture stops in the vertical or horizontal direction, and an integral re-imaging lens member L2 having a plurality of pairs of re-imaging lenses lined up vertically or horizontally corresponding to the respective aperture stops.

However, such arrangement would give rise to an increase in the size of the focus detection optical system and an increase in the laid-out space.

For this reason, there has been a specific arrangement proposed for the purpose of making a sensible tradeoff between a wider range capable of focus detection or a lot more range-finding points and a reduction in the size of the optical system (for instance, see Patent Publications 6 and 7).

With the focus detection optical system set forth in Patent Publications 6 and 7, size reductions are achievable by shared use of the re-imaging lens.

[Patent Publication 1]
JP(A)60-32012
[Patent Publication 2]
JP(A)62-25715 (JP(B)8-12321)
[Patent Publication 3]
JP(A)62-69217 (JP(B)7-31300)
[Patent Publication 4]
JP(A)1-224714 (Patent No. 2586089)
[Patent Publication 5]
JP (A) 62-79407
[Patent Publication 6]
JP(A)2001-21797
[Patent Publication 7]
JP(A)2003-75718

However, the setting of magnification of the focus detection optical system is important, too, for achieving a lot wider range capable of focus detection and a decrease in the size of the focus detection optical system. The decline of magnification might go in favor of size reductions, but incurs a decline of focus detection precision. Because the decline of magnification places some limitations on the movement of secondary object images on the light receptor element array, and as the pixel pitch of the light receptor element array cannot be made fine, it causes a decline of the minimum defocus quantity capable of detection. Thus, the focus detection resolving power declines with a decline of focus detection precision. Further, parts are more sensitive to fabrication errors, assembling errors, and adjustment errors.

On the other hand, increased magnification gives rise to an increase in the size of the focus detection optical system.

As discussed above, to make the range capable of focus detection wider, render the focal detection optical system smaller and achieve good enough focus detection precision, it is necessary to set up the focus detection optical system while setting proper magnification.

Referring here to size reductions by shared use of a re-imaging lens, it is when all range-finding points are covered with a pair of re-imaging lenses alone, as can be seen from a reference example of FIG. 20, that the highest efficient is obtained.

The focus detection optical system shown in FIG. 20 comprises, in order from a predetermine imaging plane I equivalent to the light receiving plane of an imaging device adapted to receive an image formed by a taking lens (not shown) toward a light receptor element array E, a field mask M placed near the predetermined imaging plane I and having a single aperture able to cover all range-finding points, a condenser lens L1 located near that, an aperture stop member S having a pair of apertures in the vertical and horizontal directions, a re-imaging lens member L2 having a pair of re-imaging lenses in the vertical, and the horizontal direction corresponding to the respective apertures, and a light receiving member E having a plurality of light receptor element arrays comprising light receptor elements in rows in the direction that the re-imaging lenses in pair form are lined up.

And, a pair of secondary object images formed by the re-imaging lenses are received so that there is a light intensity distribution obtained, corresponding to light beams coming from the respective pupils through any arbitrary focus detection area.

Then, a relative position relation between a pair of secondary object images received on the aforesaid light receptor element array is detected thereby detecting the focus position of the taking lens.

Such arrangement has a simplified construction; however, a wider range capable of focus, detection with a pair of re-imaging lenses alone would render it difficult to keep the flatness of the images, viz., field curvature in good enough shape. Of the sagittal (S) and meridional (M) image planes, it is thus necessary to tweak the field curvature of the meridional image plane in alignment with the direction of the light receptor element array.

Referring to how field curvature is in good enough shape, Patent Publication 4 teaches that one surface of the re-imaging lens is configured in an aspheric shape thereby correcting field curvature; however, processing into the aspheric shape is not easy, and any practical use of the aspheric surface is difficult, mainly because there is much difficulty in estimating aspheric parts.

Patent Publication 3 teaches that the quantities of decentration of the entrance- and exit-side surfaces of the re-imaging lens are varied. This might work favorably for correction of field curvature, but works against decreasing the magnification (absolute value) of the focus detection optical system and achieving size reductions, because the quantity of decentration of the aperture stop and the quantity of decentration of the entrance-side surface of the re-imaging lens have the same sign whereas the quantity of decentration of the exit-side surface of the re-imaging lens has the opposite sign, rendering it difficult to make sure the refracting power of the exit-side surface. In short, as the radius of curvature of the exit-side surface of the re-imaging lens grows small, the lens is less and less likely to be in shape.

Patent Publication 2 teaches a focus detection optical system wherein the auxiliary lens is added to just before the re-imaging lens so that there are a total of two lenses involved: this might go in favor of correction of field curvature. However, more lenses are needed for the re-imaging lens, resulting in increased parts costs. Further, the main refracting power is shared by only the exit-side surface of the re-imaging lens; this works against decreasing the magnification (absolute value) and size reductions.

The invention has for its object to provide an imaging apparatus equipped with a focus detection optical system that has a simplified construction capable of covering a wide focus detection area without using more components.

SUMMARY OF THE INVENTION

According to the invention, the aforesaid object is accomplishable by the provision of a focus detection optical system, comprising a condenser lens located near a predetermined imaging plane of a taking lens, a pupil division optical system that is located on an exit side of said condenser lens and divides a pupil of said taking lens into two pupil areas to form a pair of secondary object images with light beams passing through said pupil areas, and a light receptor element array that is located on a side of said pair of secondary object images of said pupil division optical system, so that a relative position relation between said pair of secondary object images received at said light receptor element array is detected to detect a focus position of said taking lens, characterized in that said pupil division optical system comprises an aperture stop having a pair of openings with an optical axis of said taking lens held between them and a pair of re-imaging lenses, each consisting of a double-convex lens having a convex entrance-side surface and a convex exit-side surface, wherein, when, on a plane passing through the optical axis of said taking lens and centers of gravity of the openings in said aperture stop, a surface apex is defined by a position of said convex entrance-side surface, and said convex exit-side surface, which position is extended most in a direction parallel with the optical axis of said taking lens, surface apexes of said entrance-side surface and said exit-side surface of said double-convex lens are positioned away from the optical axis of said taking lens in the same direction, and a distance of the surface apex of said entrance-side surface from the optical axis of said taking lens is larger than a distance of the surface apex of said exit-side surface from the optical axis of said taking lens.

The focus detection optical system of the invention is further characterized by satisfying the following condition:

$$0.40 < h4/h3 < 0.90 \tag{1}$$

where h3 is the quantity of decentration of the surface apex of the entrance-side surface of the re-imaging lens with respect to the optical axis of the taking lens, and h4 is the quantity of decentration of the surface apex of the exit-side surface of the re-imaging lens with respect to the optical axis of the taking lens, provided that h3 and h4 indicative of the quantities of decentration of the entrance- and exit-side surfaces of the re-imaging lens are supposed to have a plus sign in the same direction as the direction of decentration of the centers of gravity of the openings in the aperture stop corresponding to the re-imaging lens.

The focus detection optical system of the invention is further characterized by satisfying the following condition:

$$0.60 < h4/h3 < 0.85 \tag{1-1}$$

where h3 is the quantity of decentration of the surface apex of the entrance-side surface of the re-imaging lens with respect to the optical axis of the taking lens, and h4 is the quantity of decentration of the surface apex of the exit-side surface of the re-imaging lens with respect to the optical axis of the taking lens, provided that h3 and h4 indicative of the quantities of decentration of the entrance- and exit-side surface of the re-imaging lens are supposed to have a plus sign in the same direction as the direction of decentration of the centers of gravity of the openings in the aperture stop corresponding to the re-imaging lens.

The focus detection optical system of the invention is further characterized in that said aperture stop is located just before the entrance-side surface of said re-imaging lens with satisfaction of the following condition:

$$1.75 < h4/hs \tag{3}$$

where hs is the quantity of decentration of the centers of gravity of the openings in the aperture stop with respect to the optical axis of the taking lens, and h4 is the quantity of decentration of the surface apex of the exit-side surface of the re-imaging lens with respect to the optical axis of the taking lens, provided that h4 indicative of the quantity of decentration of the exit-side surface of the re-imaging lens is supposed to have a plus sign in the same direction as the direction of decentration of the centers of gravity of the openings in the aperture stop corresponding to the re-imaging lens.

The focus detection optical system of the invention is further characterized in that said aperture stop is located just before the entrance-side surface of the re-imaging lens with satisfaction of the following condition:

$$1.10 < h3/hs < 1.90 \tag{2}$$

$$0.75 < h4/hs < 1.10 \tag{3-1}$$

where hs is the quantity of decentration of the centers of gravity of the openings in the aperture stop with respect to the optical axis of the taking lens, h3 is the quantity of decentration of the surface apex of the entrance-side-surface of the re-imaging lens with respect to the optical axis of the taking lens, and h4 is the quantity of decentration of the surface apex of the exit-side surface of the re-imaging lens with respect to the optical axis of the taking lens, provided that h3 and h4 indicative of the quantities of decentration of the entrance- and exit-side surfaces of the re-imaging lens are supposed to have a plus sign in the same direction as the direction of decentration of the centers of gravity of the openings in the aperture stop corresponding to the re-imaging lens.

The focus detection optical system of the invention is further characterized by satisfying the following condition:

$$0.10 < |mg| < 0.30 \tag{4}$$

where mg is the d-line imaging magnification of the focus detection optical system.

The focus detection optical system of the invention is further characterized by satisfying the following condition:

$$-1.50 < R2/R1 < -0.75 \tag{5}$$

where R1 is the paraxial radius of curvature of the entrance-side surface of the condenser lens, and R2 is the paraxial radius of curvature of the exit-side surface of the condenser lens.

The focus detection optical system of the invention is further characterized by satisfying the following condition:

$$-0.90 < R4/R3 < -0.10 \tag{6}$$

where R3 is the radius of curvature of the entrance-side surface of the re-imaging lens at the surface apex, and R4 is the radius of curvature of the exit-side surface of the re-imaging lens at the surface apex.

The invention also provides an imaging apparatus comprising an imaging device adapted to take an image formed by said taking lens, said focus detection optical system, and a reflective member adapted to reflect a light beam from said taking lens and guide said light beam to said predetermined imaging plane, wherein said reflective member retracts out of a taking optical path upon taking an image with said imaging device.

Further, the invention provides an imaging apparatus comprising an imaging device adapted to take an image formed by said taking lens, said focus detection optical system, and a reflective member adapted to reflect and transmit a light beam from said taking lens, wherein said imaging device is located on one of a reflective or transmissive side of said reflective member and said focus detection optical system is located on the other.

According to the focus detection optical system of the invention, the surface apexes of the entrance- and exit-side surfaces of the re-imaging lens or double-convex lens are positioned away from the optical axis of the taking lens in the same direction and the distance of the surface apex of the entrance-side surface from the optical axis of the taking lens is set larger than the distance of the surface apex of the exit-side surface from the optical axis of the taking lens. It is thus easy to hold back the asymmetrical occurrence of field curvature at the upper and lower peripheries of the secondary object image plane, resulting in the ability to widen a range capable of good enough focus detection.

That is, it is possible to provide a focus detection optical system that is less likely to be affected by its own field curvature and so provide coverage for a wide focus detection area.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

The optical system of the invention is now explained with reference to several examples.

Figure 1A:
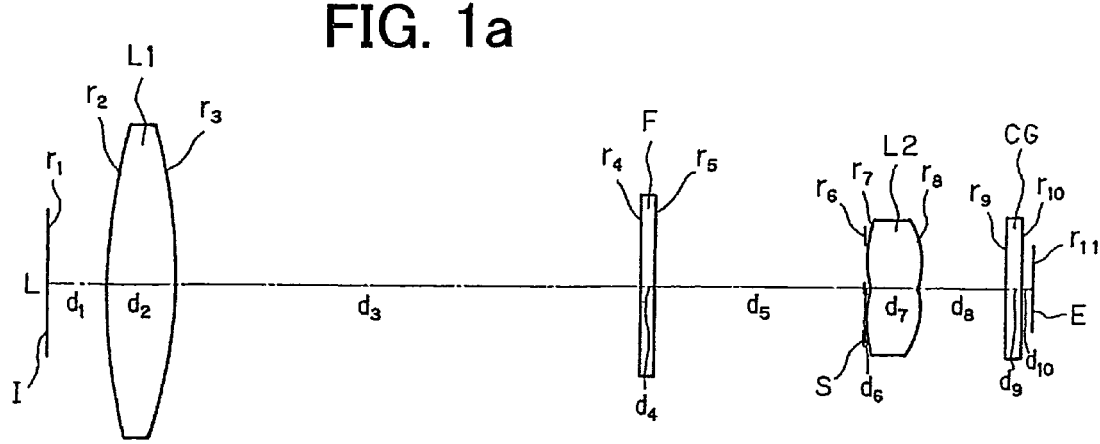
FIG. 1 is illustrative of the optical arrangement of the focus detection optical system according to Example 1 of the invention: (a) is a sectional view of a taking lens along its optical axis, and (b) is illustrative of the quantity of decentration of the center of gravity of openings in an aperture stop and the quantity of decentration of the entrance- and exit-side surface of a re-imaging lens in the case of (a).
Figure 1B:
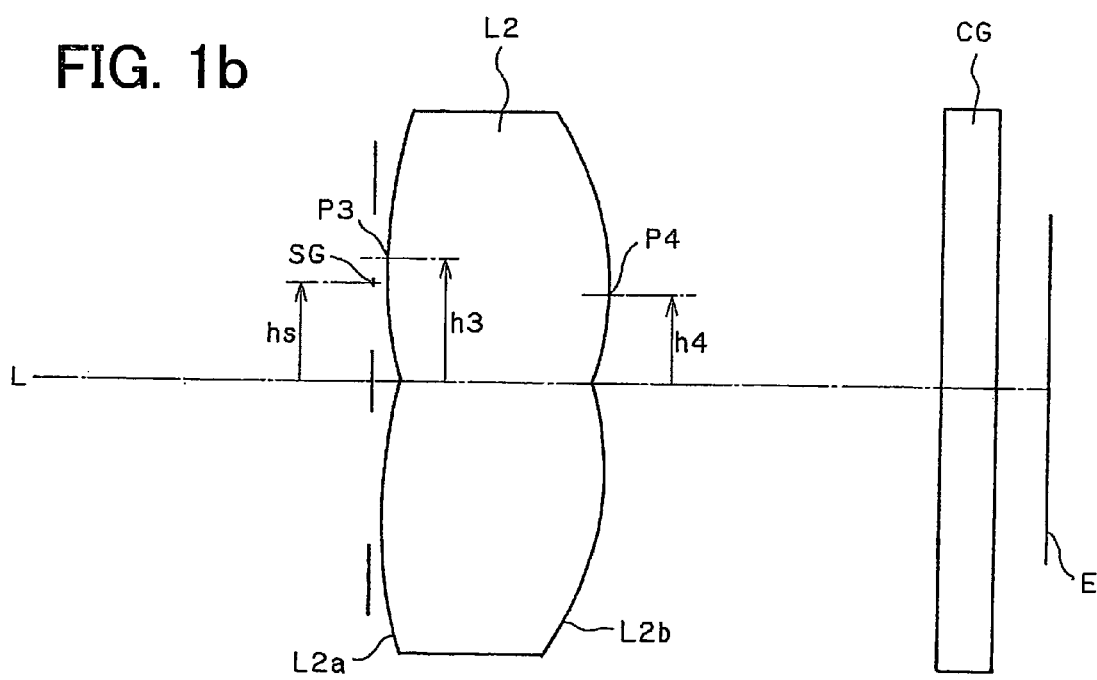

FIG. 1 is illustrative of the optical arrangement of Example 1 of the focus detection optical system that is to be mounted on the imaging apparatus of the invention: FIG. 1(*a*) is a sectional view of a taking lens along an optical axis with the proviso that the direction that a pair of openings and a pair of re-imaging lenses are lined up lies on the plane of the paper, and FIG. 1(*b*) is illustrative of the quantities of decentration of the aperture stop and re-imaging lenses in FIG. 1(*a*).

As depicted in FIG. 1(*a*), the focus detection optical system of the invention comprises a condenser lens L1 located near a predetermined imaging plane I of a taking lens 1, a pupil division optical system that is located on the exit side of the condenser lens L1 and divides the pupil of the taking lens 1 into two pupil areas to form a pair of secondary object images with light beams passing through those pupil areas, and a light receptor element array E located on the side of a pair of secondary object images of the pupil division optical system so that the relative position relation between a pair of secondary object images received at the light receptor element array E is detected thereby detecting the focus position of the taking lens 1.

The pupil division optical system comprises an aperture stop S having a pair of openings, with the optical axis L of the taking lens 1 held between them, and a pair of re-imaging lenses L2, and each of a pair of re-imaging lenses L2 is made up of a double-convex lens having a convex entrance-side surface L2a and a convex exit-side surface L2b.

In the invention, the optical axis L of the condenser lens L1 is in alignment with the optical axis L of the taking lens 1. The condenser lens L1 is configured in a rotationally symmetric shape about the optical axis L of the taking lens 1.

The entrance-side surface L2a, and the exit-side surface L2b of each re-imaging lens L2 is such that a spherical surface with the optical axis L of the taking lens 1 as an axis of rotational symmetry is parallel translated vertically to the optical axis L of the taking lens 1 toward the center of gravity SG of the corresponding opening in the aperture stop S.

The light receptor element array E has light receptor elements lined up on a plane. A plurality of light receptor element arrays E may be provided on a plane.

Further, the centers of gravity SG of the openings in the aperture stop S, the openings, the re-imaging lenses L2 and the light receptor element arrays E are located in pair form and symmetrically about the optical axis L of the taking lens 1.

Here, as shown in FIG. 1(*b*), let hs be the quantities of decentration of the centers of gravity SG of the openings in the aperture stop S with respect to the optical axis L of the taking lens 1, P3 and P4 be surface apexes defined by the positions of the convex entrance- and exit-side surfaces L2a and L2b of the re-imaging lens L2 that are extended most in a direction parallel with the optical axis L of the taking lens 1, h3 be the quantity of decentration of the surface apex P3 of the entrance-side surface L2a, and h4 be the quantity of decentration of the surface apex P4 of the exit-side surface L2b of the re-imaging lens L2 with respect to the optical axis L of the taking lens 1, with the proviso that the quantities of decentration h3 and h4 of the entrance- and exit-side surfaces L2a and L2b of the re-imaging lens L2 are supposed to have a plus sign in the same direction as the direction of the centers of gravity SG of the openings in the aperture stop corresponding to the re-imaging lens L2.

The entrance- and exit-side surfaces L2a and L2b of the re-imaging lens L2 are each configured in a convex, spherical shape, and the quantity of decentration h3 of the entrance-side surface is larger than h4 of the exit-side surface.

Thus, that both entrance- and exit-side surfaces L2a and L2b of the re-imaging lens L2 are in a convex shape facilitates giving a strong positive refracting power to the re-imaging lens L2, and goes in favor of the correction of spherical aberrations, because even when there is a decreased magnification (absolute value), the positive refracting power can be shared by two surfaces.

As the refracting power of the re-imaging lens L2 is increased, on the other hand, it makes the secondary object image plane likely to produce negative field curvature. Here when the optical axis of the re-imaging lens L2 is parallel with the optical axis L of the taking lens, the quantity of field curvature on the periphery of the secondary object image plane is going to differ in the upper and the lower side of the secondary object image, because the openings in the aperture stop and the re-imaging lenses L2 remain decentered with respect to the optical axis L of the taking lens 1.

Figure 18A:
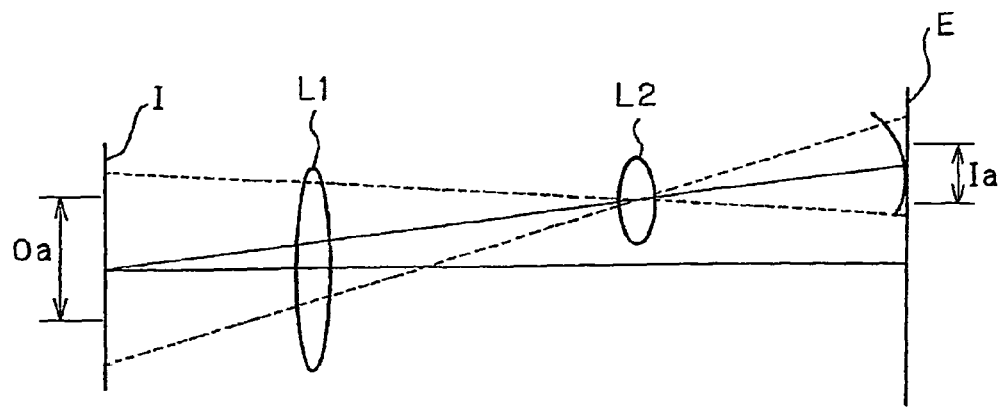
FIG. 18(*a*)-(*c*) is illustrative in schematic of an area having good field curvature.
Figure 18B:
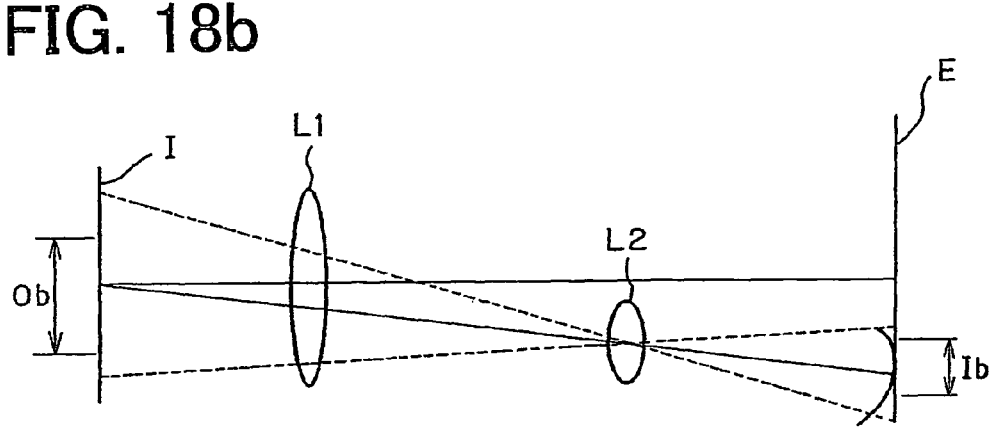
Figure 18C:
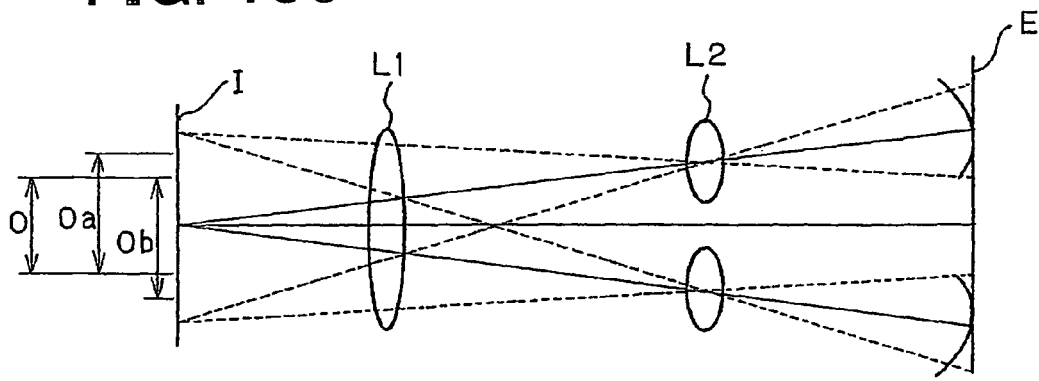
Figure 19:
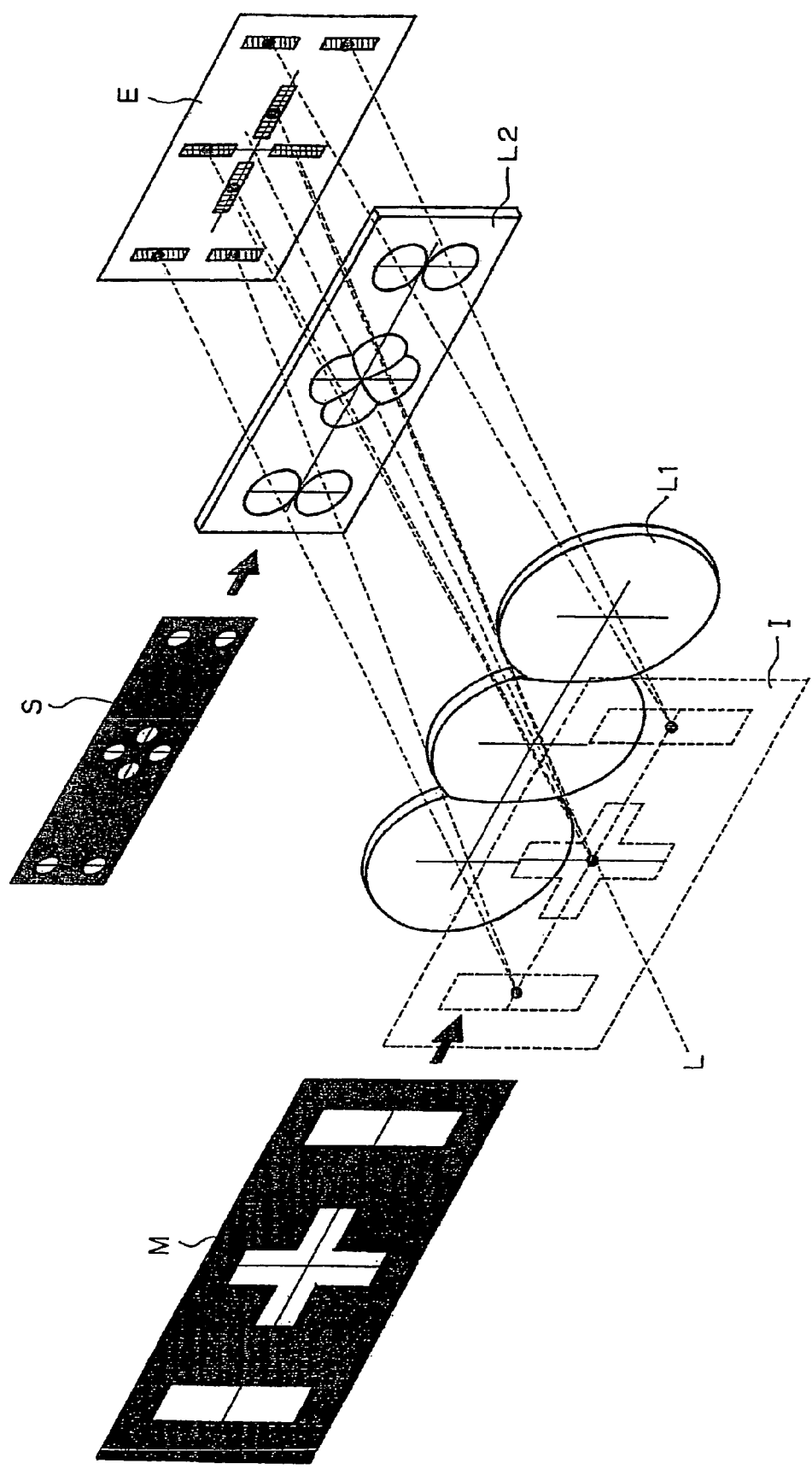
FIG. 19 is illustrative in schematic of the arrangement of a prior art focus detection optical system.

FIG. 18 is illustrative in schematic of an area with good enough field curvature. In an arrangement comprising a predetermined imaging plane I, a condenser lens L1, a (pair of) re-imaging lens L2 where an axis of connecting together an entrance-side surface apex and an exit-side surface apex is parallel with the optical axis L of a taking lens 1 and a light receptor element array E, FIGS. 18(a) and 18(b) show in what state field curvature is produced by a pair of re-imaging lenses L2. With the focus detection optical system of FIG. 18(a), a range where there is good enough field curvature obtained is indicated at Ia on the secondary object image plane, and Oa on the predetermined imaging plane. With the focus detection optical system of FIG. 18(b), on the other hand, a range where there is good enough field curvature obtained is indicated at Ib on the secondary object image plane, and Ob on the predetermined imaging plane. In consideration of both FIGS. 18(a) and 18(b), therefore, the range capable of implementing good enough focus detection is narrowed down to a range O where Oa and Ob overlap, as shown in FIG. 18(c).

Thus, an attempt to broaden the range capable of focus detection often causes the asymmetry of field curvature to have some adverse influences on focus detection precision. For this reason, it is desired that the quantity of field curvature at the periphery of the secondary object image is almost the same on the upper and the lower side thereof. In short, given the symmetry of the focus detection optical system for the formation of two secondary object images, it is when the field curvature is almost the same on the upper and the lower side of the secondary object images that there is a wide area obtained with field curvature corrected by both the corresponding secondary object images; the range capable of focus detection can be broadened.

The invention takes aim at tweaking the quantities of decentration of the entrance- and exit-side surfaces L2a and L2b of the re-imaging lens L2, thereby correcting this asymmetry of field curvature.

A change in the quantities of relative decentration of the entrance- and exit-side surfaces L2a and L2b of the re-imaging lens L2 could lead to a change in the state of field curvature occurring at the peripheries of the upper and the lower side of the secondary object image.

Therefore, as is the case with the focus detection optical system of the invention, the surface apexes P3 and P4 of the entrance- and exit-side surfaces L2a and L2b of the re-imaging lens L2 or double-convex lens are positioned away from the optical axis L of the taking lens 1 in the same direction, and the distance of the surface apex P3 of the entrance-side surface L2a from the optical axis L of the taking lens 1 is set larger than the distance of the surface apex P4 of the exit-side surface L2b from the optical axis of the taking lens. This arrangement facilitates reducing the asymmetric occurrence of field curvature at the peripheries of the upper and the lower side of the secondary object image plane, thereby making it possible to broaden the range capable of implementing good enough focus detection.

Thus, if the entrance- and exit-side surfaces L2a and L2b of the re-imaging lens 12 are each made up of a convex surface and, with respect to the optical axis L of the taking lens 1, the quantity of decentration of the entrance-side surface L2a of the re-imaging lens L2 is set larger than that of the exit-side surface 12b, it is then possible to provide a focus detection optical system that holds back the influences of field curvature and so is suitable for covering a wide focus detection area.

For the invention, it is preferable to satisfy the following condition:

$$0.40 < h4/h3 < 0.90 \quad (1)$$

where h3 is the quantity of decentration of the surface apex P3 of the entrance-side surface L2a of the re-imaging lens L2 with respect to the optical axis L of the taking lens 1, and h4 is the quantity of decentration of the surface apex P4 of the exit-side surface L2b of the re-imaging lens L2 with respect to the optical axis L of the taking lens 1, provided that h3 and h4 indicative of the quantities of decentration of the entrance- and exit-side surfaces L2a and L2b of the re-imaging lens L2 are supposed to have a plus sign in the same direction as the direction of decentration of the centers of gravity SG of the openings in the aperture stop S corresponding to the re-imaging lens L2.

Such arrangement contributes to further reductions in the asymmetry of field curvature, and works favorably for making sure the range capable of focus detection.

Condition (1) is to allow field curvature to perform better. Abiding by the lower limit reduces the quantity of a misalignment between the entrance- and exit-side surfaces L2a and L2b of the re-imaging lens L2, facilitating holding back the occurrence of field curvature near the optical axis L of the taking lens 1 while making sure the refracting power of the exit-side surface L2b. Abiding by the upper limit makes it easy to prevent field curvature from occurring away from the optical axis L of the taking lens 1.

For the invention, it is preferable to satisfy the following condition:

$$0.60 < h4/h3 < 0.85 \quad (1\text{-}1)$$

where h3 is the quantity of decentration of the surface apex P3 of the entrance-side surface L2a of the re-imaging lens L2 with respect to the optical axis L of the taking lens 1, and h4 is the quantity of decentration of the surface apex P4 of the exit-side surface L2b of the re-imaging lens L2 with respect to the optical axis L of the taking lens 1, provided that h3 and h4 indicative of the quantities of decentration of the entrance- and exit-side surface L2a and L2b of the re-imaging lens 2 are supposed to have a plus sign in the same direction as the direction of decentration of the centers of gravity SG of the openings in the aperture stop S corresponding to the re-imaging lens L2.

Such arrangement is more preferable for keeping the asymmetry of field curvature in check.

For the invention, it is preferable that the aperture stop S is located just before the entrance-side surface L2a of the re-imaging lens L2 with satisfaction of the following condition:

$$0.75 < h4/hs \quad (3)$$

where hs is the quantity of decentration of the centers of gravity SG of the openings in the aperture stop S with respect to the optical axis L of the taking lens 1, and h4 is the quantity of decentration of the surface apex P4 of the exit-side surface L2b of the re-imaging lens L2 with respect to the optical axis L of the taking lens 1, provided that h4 indicative of the quantity of decentration of the exit-side surface L2b of the re-imaging lens L2 is supposed to have a plus sign in the same direction as the direction of decentration of the centers of gravity SG of the openings in the aperture stop S corresponding to the re-imaging lens L2.

Condition (3) is to specify the quantity of a misalignment of the apex of the exit-side surface L2b of the re-imaging lens L2 with respect to the centers of gravity SG of the openings in the aperture stop S. With a change in the quantity of relative decentration between the openings in the aperture stop S and the re-imaging lens L2, there is a change in the quantity of coma produced.

By abiding by the lower limit to condition (3), it is possible to bring the quantities of coma produced out of two secondary object images re-imaged on the light receptor element array E close to each other, thereby making it easy to keep a good correlation between two secondary object images. This works favorably for reducing errors upon correlative computation of two images, and making sure focus detection capability.

For the invention, it is preferable that the aperture stop S is located just before the entrance-side surface L2a of the re-imaging lens L2 with satisfaction of the following conditions:

$$1.10 < h3/hs < 1.90 \quad (2)$$

$$0.75 < h4/hs < 1.10 \quad (3\text{-}1)$$

where hs is the quantity of decentration of the centers of gravity SG of the openings in the aperture stop S with respect to the optical axis L of the taking lens 1, h3 is the quantity of decentration of the surface apex P3 of the entrance-side surface L2a of the re-imaging lens L2 with respect to the optical axis L of the taking lens 1, and h4 is the quantity of decentration of the surface apex P4 of the exit-side surface L2b of the re-imaging lens L2 with respect to the optical axis L of the taking lens 1, provided that h3 and h4 indicative of the quantities of decentration of the entrance- and exit-side surfaces L2a and L2b of the re-imaging lens L2 are supposed to have a plus sign in the same direction as the direction of decentration of the centers of gravity SG of the openings in the aperture stop S corresponding to the re-imaging lens L2.

Condition (2) is to specify the quantity of a misalignment of the apex of the entrance-side surface L2a of the re-imaging lens L2 with respect to the centers of gravity SG of the openings in the aperture stop S. By abiding by the lower and upper limits to condition (2), it is easy to make small the angle of incidence of light beams on the entrance-side surface L2a of the re-imaging lens L2 and hold back spherical aberrations due to decentration.

Condition (3-1) is to specify the quantity of a misalignment of the surface apex P4 of the exit-side surface L2b of the re-imaging lens L2 with respect to the centers of gravity SG of the openings in the aperture stop S. By abiding by the lower and upper limits to condition (3-1), it is easy to correct coma and field curvature for asymmetry while making sure the refracting power of the exit-side surface L2b of the re-imaging lens L2.

More preferably, the lower and upper limits to condition (2) should be set at 1.2 and 1.8, respectively. More preferably, the lower and upper limits to condition (3-1) should be set at 0.85 and 1.0, respectively.

For the invention, it is preferable to satisfy the following condition:

$$0.10 < |mg| < 0.30 \quad (4)$$

where mg is the d-line imaging magnification of the focus detection optical system.

Condition (4) is to define a proper magnification. By abiding by the lower limit to condition (4), it is easy to make sure focus detection precision, and by abiding by the upper limit to condition (4), it is easy to prevent the focus detection optical system from getting bulky.

More preferably, the lower and upper limits to condition (4) should be set at 0.15 and 0.27, respectively.

For the invention, it is preferable to satisfy the following condition:

$$-1.50 < R2/R1 < -0.75 \quad (5)$$

where R1 is the paraxial radius of curvature of the entrance-side surface of the condenser lens L1, and R2 is the paraxial radius of curvature of the exit-side surface of the condenser lens L2.

Condition (5) is to specify the shape of the condenser lens L1. By abiding by the lower or upper limit to condition (5), it is possible to prevent the refracting power of one surface of the condenser lens L1 from getting strong, going in favor of correction of distortion.

More preferably, the lower and lower limits to condition (5) should be set at −1.4 and −0.85, respectively.

For the invention, it is preferable to satisfy the following condition:

$$-0.90 < R4/R3 < -0.10 \quad (6)$$

where R3 is the radius of curvature of the entrance-side surface L2a of the re-imaging lens L2 at the surface apex P3, and R4 is the radius of curvature of the exit-side surface L2b of the re-imaging lens L2 at the surface apex P4.

Condition (6) is to specify the shape of the re-imaging lens L2. By abiding by the lower limit to condition (6) thereby making sure the refracting power of the exit-side surface L2b, it is easy to hold back spherical aberrations when the magnification (absolute value) of the re-imaging lens L2 is made small, going in favor of size reductions of the focus detection optical system.

By abiding by the upper limit to condition (6), it is possible to prevent too much refracting power from being shared by the exit-side surface L2b, going in favor of holding back aberrations. If condition (6) is satisfied along with condition (1), it is also favorable for correcting field curvature for asymmetry.

More preferably, the lower and upper limits to condition (6) should be set at −0.8 and −0.2, respectively.

In one preferable embodiment, the focus detection optical system of the invention is incorporated into an imaging apparatus of the type that comprises an imaging device 3 adapted to take an image formed by a taking lens 1 and a reflective member 4 adapted to reflect a light beam from the taking lens 1 and guide it to a predetermined imaging plane I, wherein the reflective member 4 retracts out of a taking optical path when images are taken by the imaging device 3.

In another preferable embodiment, the focus detection optical system of the invention is incorporated into an imaging apparatus of the type that comprises an imaging device 3 adapted to take an image formed by a taking lens 1 and a reflective member 4 adapted to reflect and transmit a light beam from the taking lens 1, wherein the imaging device 3 is located on one of a reflective side and a transmissive side of the reflective member 4, and a focus detection system is located on the other.

Figure 20:
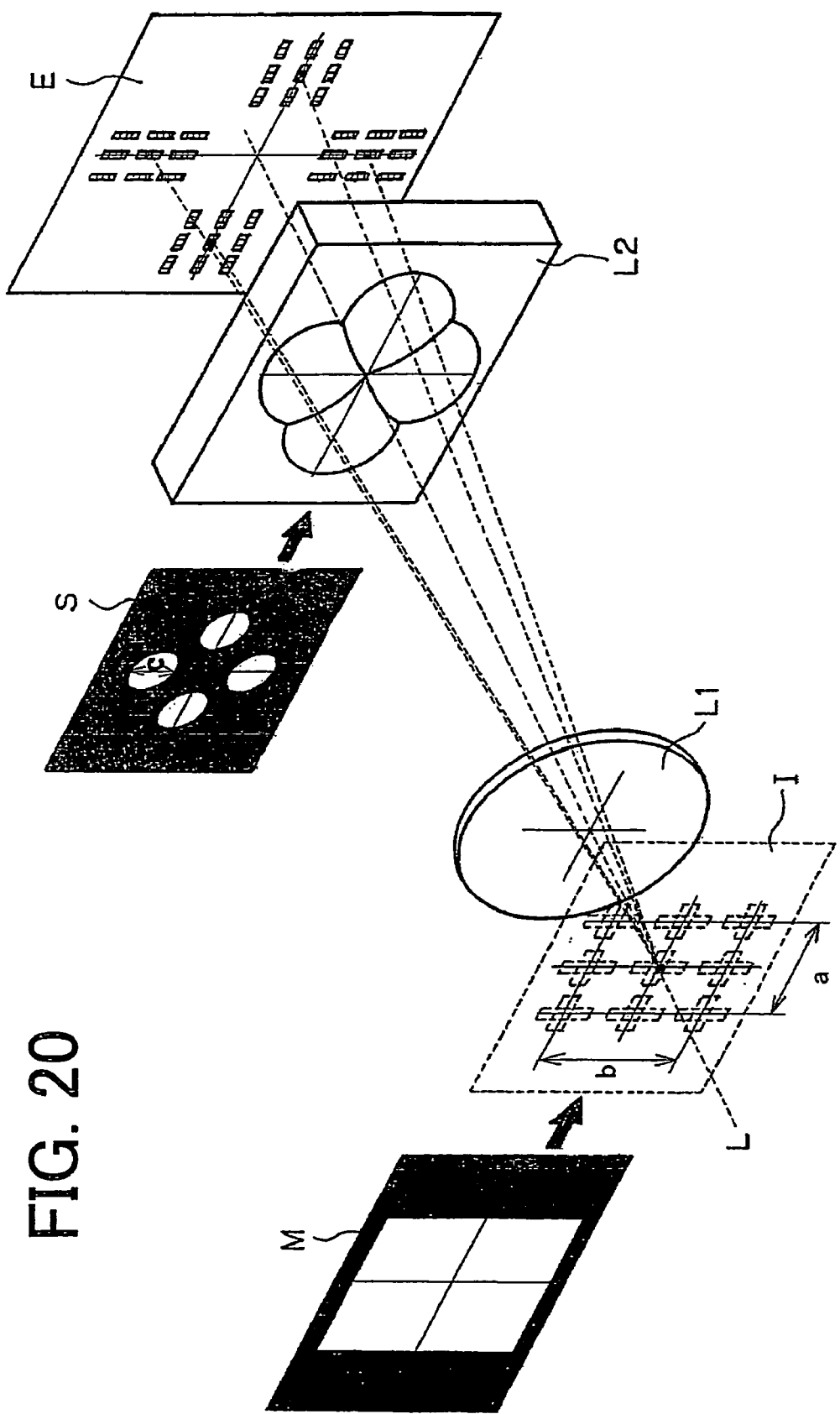
FIG. 20 shows a reference example illustrative in schematic of the basic arrangement of a focus detection optical system.

The invention is now explained with reference to several examples wherein the coverage for the range capable of focus detection is figured out. Note here that this value is found from the ratio of the size of the range capable of focus detection to taking size, with 4/3 inches (18 mm×13.5 mm) set as that taking size. It is also noted that the size a×b of the range capable of focus detection is supposed to be the range of the predetermined imaging plane I shown in FIG. 20 capable of focus detection, and the opening size of the aperture stop S is supposed to correspond to c in FIG. 20.

Example 1

As shown in FIG. 1(a), Example 1 is directed to a focus detection optical system that, in order from a predetermined imaging plane I equivalent to the imaging plane of a taking lens 1 (not shown) toward a light receptor element array E, a condenser lens L1, an infrared filter F, an aperture stop S having a pair of openings, a re-imaging lens L2 made up of a pair of re-imaging lenses set up as an integral unit, and a cover glass CG.

In Example 1, range-finding size a×b, coverage, and opening size c of the stop S is:
  Range-finding size (a×b): 10.4×5.2
  Coverage: 58%×39%
  Stop opening size (c): 1.72

Example 2

Figure 2:
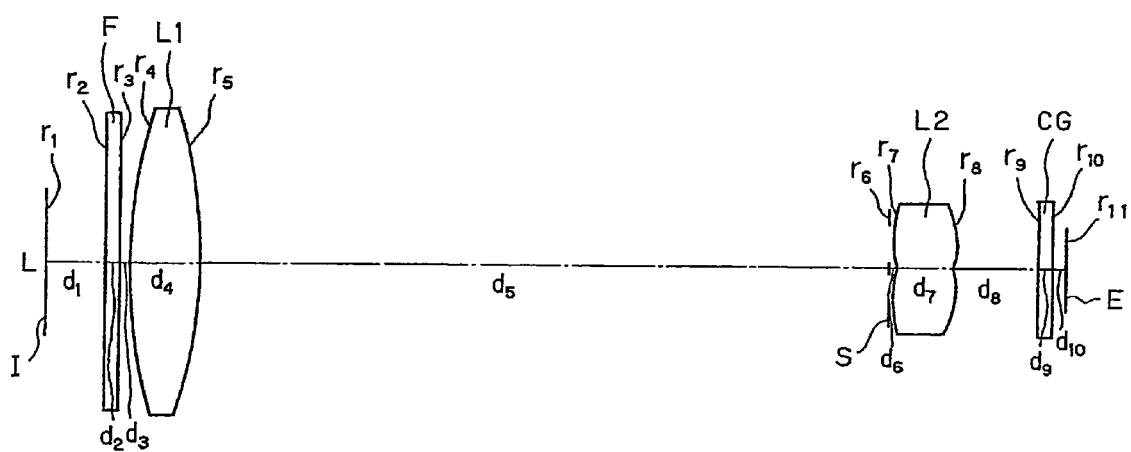
FIG. 2 is illustrative of the optical arrangement of the focus detection optical system according to Example 2 of the invention.

The focus detection optical system of Example 2 is shown in FIG. 2. A condenser lens L1 and an infrared cut filter F are opposite in position to those in Example 1 shown in FIG. 1. The arrangement is otherwise much the same as in Example 1.

As shown in FIG. 2, Example 2 is directed to a focus detection optical system that, in order from a predetermined imaging plane I equivalent to the imaging plane of a taking lens 1 (not shown) toward a light receptor element array E, an infrared cut filter F, a condenser lens L1, an aperture stop S having a pair of openings, a re-imaging lens L2 made up of a pair of re-imaging lenses set up as an integral unit, and a cover glass CG.

In Example 2, range-finding size a×b, coverage, and opening size c of the stop S is:
  Range-finding size (a×b): 10.4×5.2
  Coverage: 58%×39%
  Stop opening size (c): 1.72

Example 3

Figure 3:
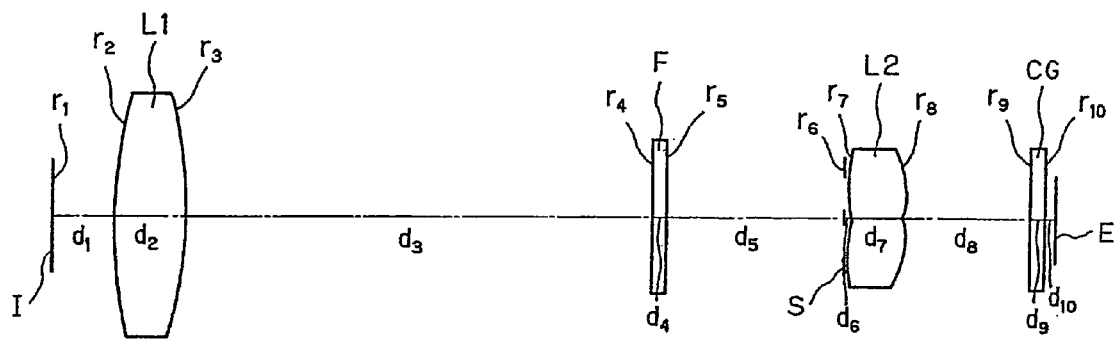
FIG. 3 is illustrative of the optical arrangement of the focus detection optical system according to Example 3 of the invention.

The focus detection optical system of Example 3 is shown in FIG. 3. The arrangement is much the same as in Example 1.

As shown in FIG. 3, Example 3 is directed to a focus detection optical system that, in order from a predetermined imaging plane I equivalent to the imaging plane of a taking lens 1 (not shown) toward a light receptor element array E, a condenser lens L1, an infrared cut filter F, an aperture stop S having a pair of openings, a re-imaging lens L2 made up of a pair of re-imaging lenses set up as an integral unit, and a cover glass CG.

In Example 3, range-finding size a×b, coverage, and opening size c of the stop S is:
  Range-finding size (a×b): 7.6×3.8
  Coverage: 42%×28%
  Stop opening size (c): 1.64

Example 4

Figure 4:
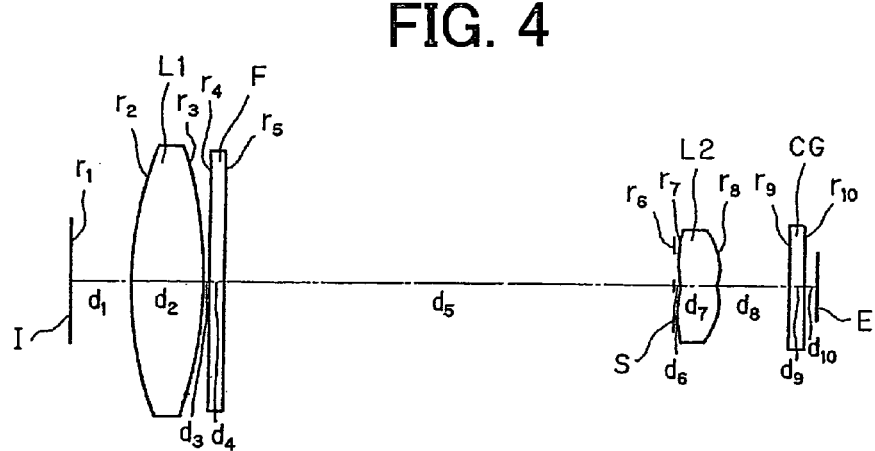
FIG. 4 is illustrative of the optical arrangement of the focus detection optical system according to Example 4 of the invention.

The focus detection optical system of Example 4 is shown in FIG. 4. The arrangement is much the same as in Example 1.

As shown in FIG. 4, Example 4 is directed to a focus detection optical system that, in order from a predetermined imaging plane I equivalent to the imaging plane of a taking lens 1 (not shown) toward a light receptor element array E, a condenser lens L1, an infrared cut filter F, an aperture stop S having a pair of openings, a re-imaging lens L2 made up of a pair of re-imaging lenses set up as an integral unit, and a cover glass CG.

In Example 4, range-finding size a×b, coverage, and opening size c of the stop S is:
  Range-finding size (a×b): 8.6×4.2
  Coverage: 48%×31%
  Stop opening size (c): 1.20

Example 5

Figure 5:
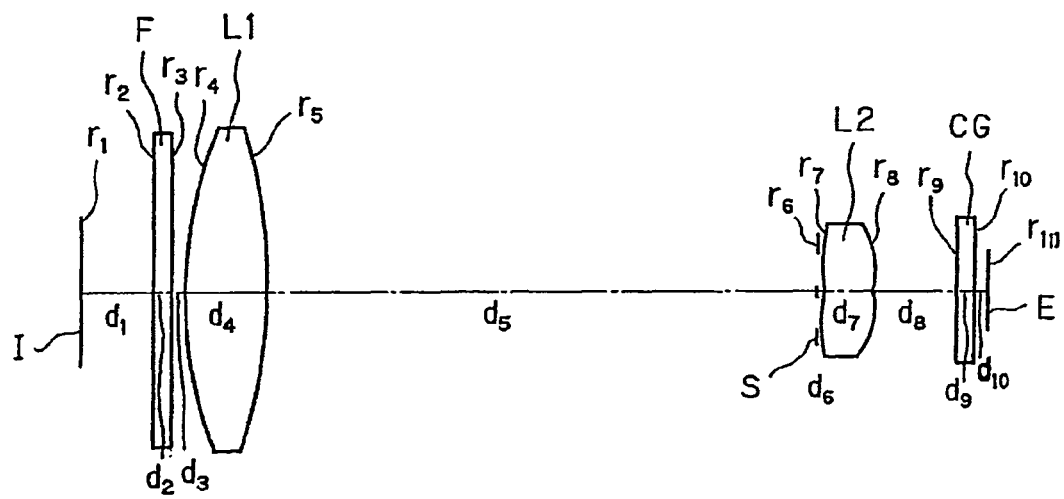
FIG. 5 is illustrative of the optical arrangement of the focus detection optical system according to Example 5 of the invention.

The focus detection optical system of Example 5 is shown in FIG. 5. A condenser lens L1 and an infrared cut filter F are opposite in position to those in Example 1 shown in FIG. 1. The arrangement is otherwise much the same as in Example 1.

As shown in FIG. 5, Example 5 is directed to a focus detection optical system that, in order from a predetermined imaging plane I equivalent to the imaging plane of a taking lens 1 (not shown) toward a light receptor element array E, an infrared cut filter F, a condenser lens L1, an aperture stop S having a pair of openings a re-imaging lens L2 made up of a pair of re-imaging lenses set up as an integral unit, and a cover glass CG.

In Example 5, range-finding size a×b, coverage, and opening size c of the stop S is:
  Range-finding size (a×b): 8.6×4.2
  Coverage: 48%×31%
  Stop opening size (c): 1.20

Example 6

Figure 6:
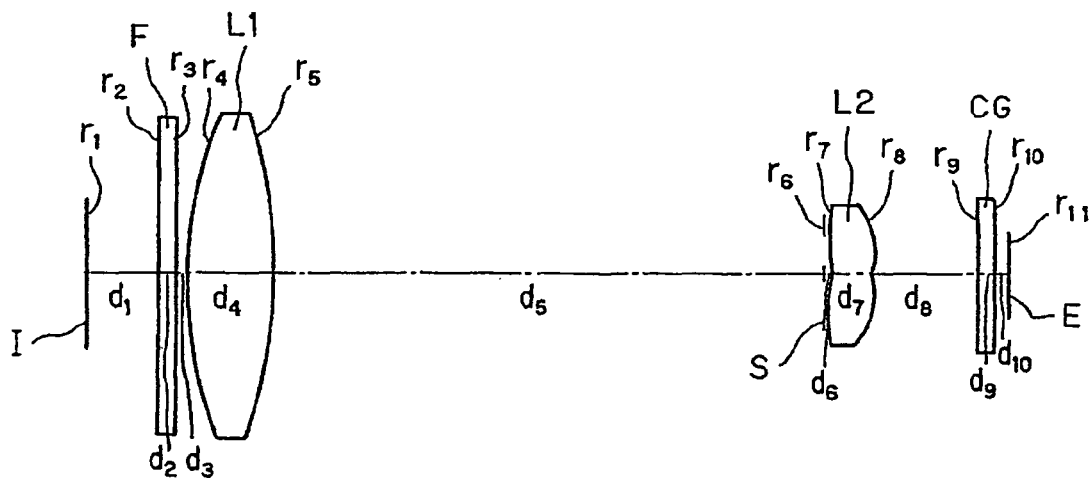
FIG. 6 is illustrative of the optical arrangement of the focus detection optical system according to Example 5 of the invention.
Figure 7:
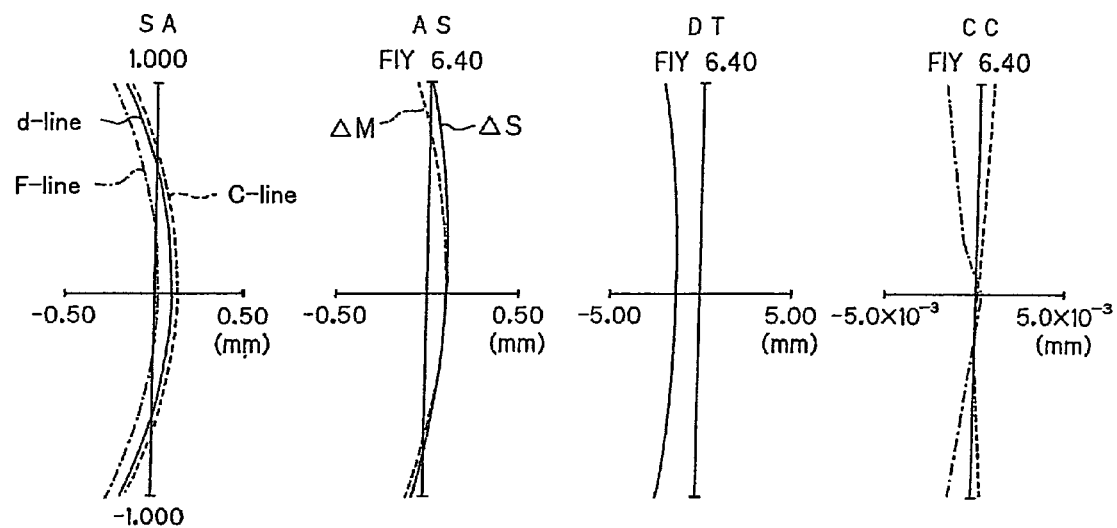
FIG. 7 is an aberration diagram for the focus detection optical system according to Example 1 of the invention.
Figure 8:
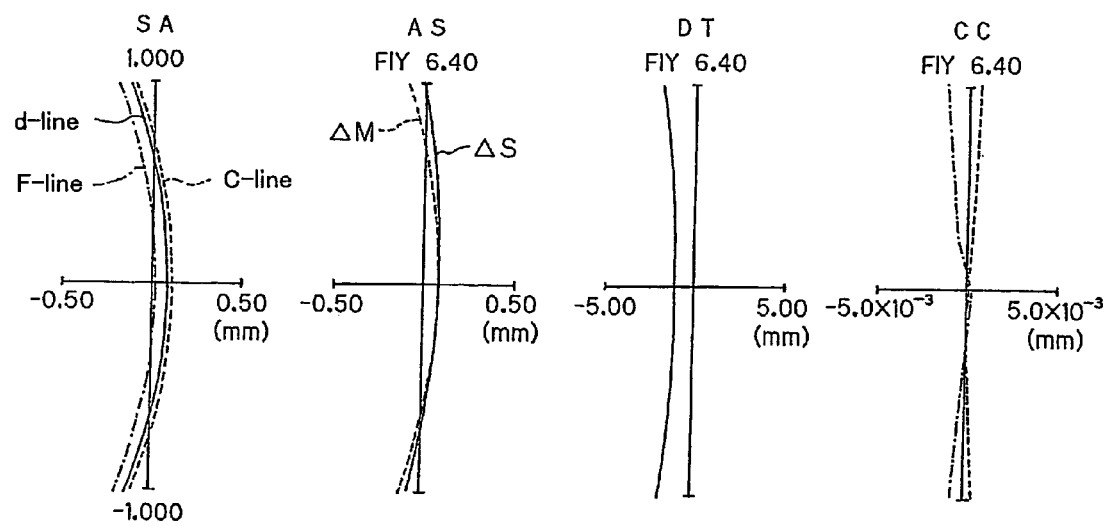
FIG. 8 is an aberration diagram for the focus detection optical system according to Example 2 of the invention.
Figure 9:
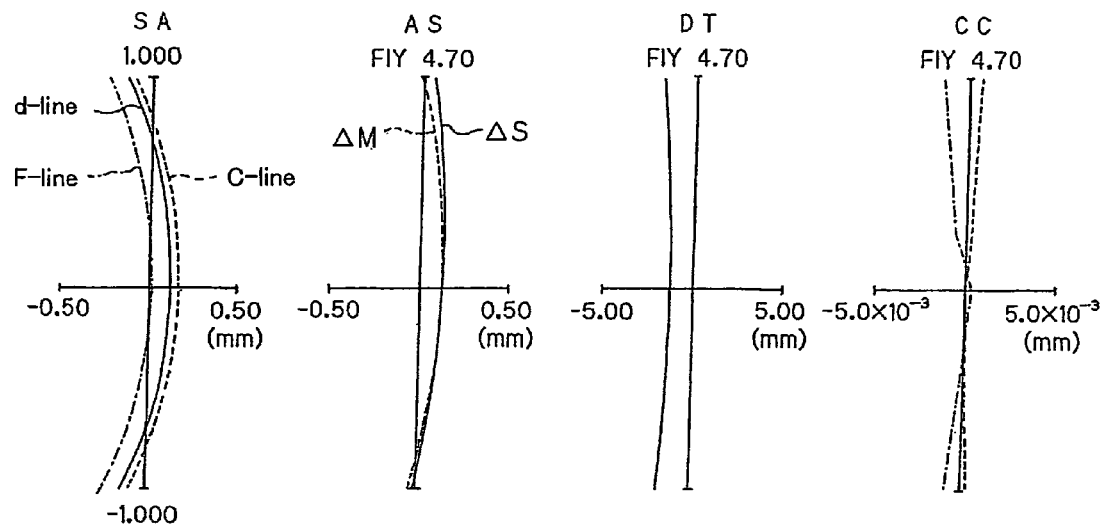
FIG. 9 is an aberration diagram for the focus detection optical system according to Example 3 of the invention.
Figure 10:
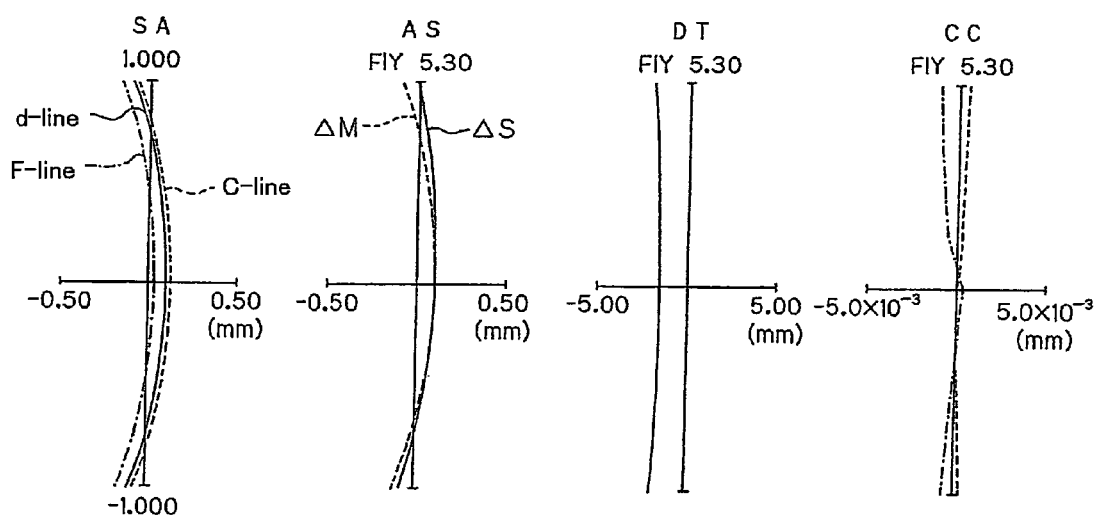
FIG. 10 is an aberration diagram for the focus detection optical system according to Example 4 of the invention.
Figure 11:
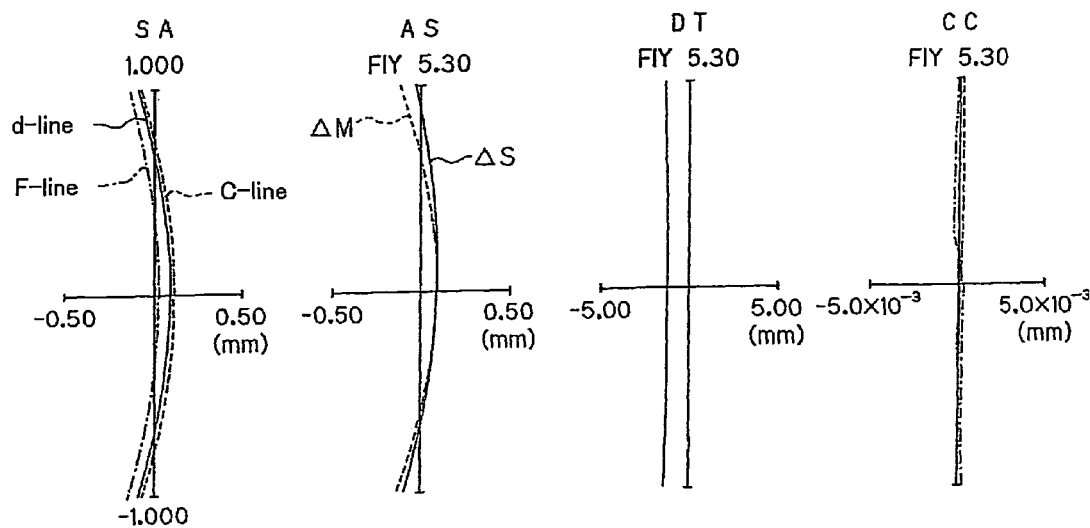
FIG. 11 is an aberration diagram for the focus detection optical system according to Example 5 of the invention.
Figure 12:
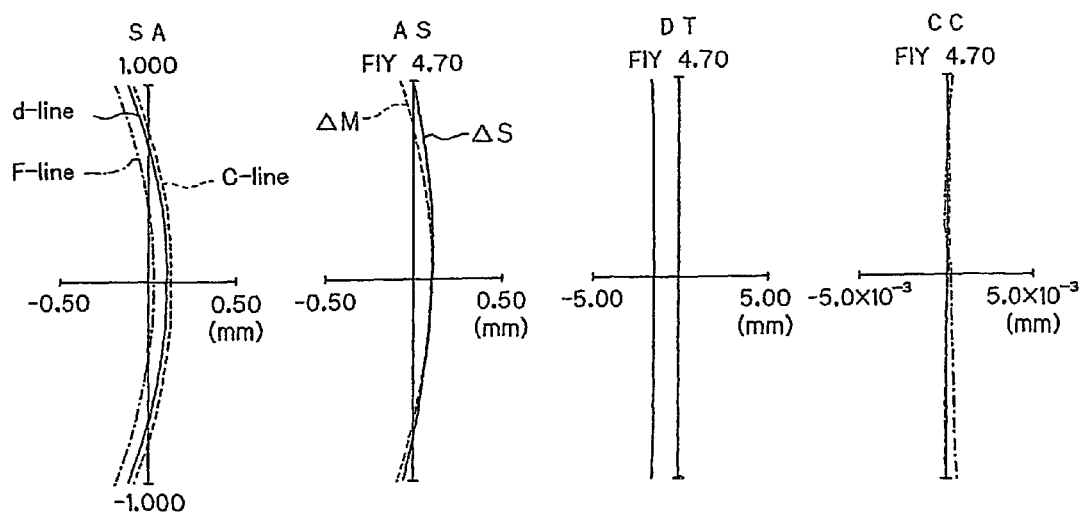
FIG. 12 is an aberration diagram for the focus detection optical system according to Example 6 of the invention.

The focus detection optical system of Example 5 is shown in FIG. 6. A condenser lens L1 and an infrared cut filter F are opposite in position to those in Example 1 shown in FIG. 1. The arrangement is otherwise much the same as in Example 1.

As shown in FIG. 6, Example 6 is directed to a focus detection optical system that, in order from a predetermined imaging plane I equivalent to the imaging plane of a taking lens 1 (not shown) toward a light receptor element array E, an infrared cut filter F, a condenser lens L1, an aperture stop S having a pair of openings, a re-imaging lens L2 made up of a pair of re-imaging lenses set up as an integral unit, and a cover glass CG.

In Example 6, range-finding size a×b, coverage, and opening size c of the stop S is:
  Range-finding size (a×b): 7.6×3.8
  Coverage: 42%×28%
  Stop opening size (c): 1.20

Set out below are the values of the conditions in the respective examples.

|  |  | Example | | | | | |
| --- | --- | --- | --- | --- | --- | --- | --- |
|  |  | 1 | 2 | 3 | 4 | 5 | 6 |
| Condition | (1) | 0.74 | 0.74 | 0.66 | 0.68 | 0.66 | 0.54 |
|  | (2) | 1.29 | 1.27 | 1.43 | 1.40 | 1.43 | 1.74 |
|  | (3) | 0.95 | 0.94 | 0.94 | 0.95 | 0.94 | 0.94 |
|  | (4) | 0.18 | 0.18 | 0.24 | 0.21 | 0.21 | 0.24 |
|  | (5) | −0.94 | −0.99 | −0.93 | −1.28 | −1.33 | −1.26 |
|  | (6) | −0.63 | −0.75 | 0.44 | −0.48 | −0.48 | −0.25 |

Numerical data on the optical members forming the focus detection optical system of each example are now given. In the numerical data here, r1, r2, are indicative of the radii of curvature of the respective optical function surfaces; d1, d2, . . . are indicative of the thicknesses of, or the air spaces between, the respective optical members; nd1, nd2, . . . are indicative of the d-line refractive indices of the respective optical members, and vd1, vd2, . . . are indicative of the Abbe's constants of the respective optical members.

Let z be an optical axis direction, y be a direction orthogonal to the optical axis, and K be a conical coefficient. Then, aspheric shape is given by $$z=(y^2/r)/[1+\sqrt{1-(1+K)(y/r)^2}]$$

These symbols are also common to numerical data on the examples given later.

Figure 13:
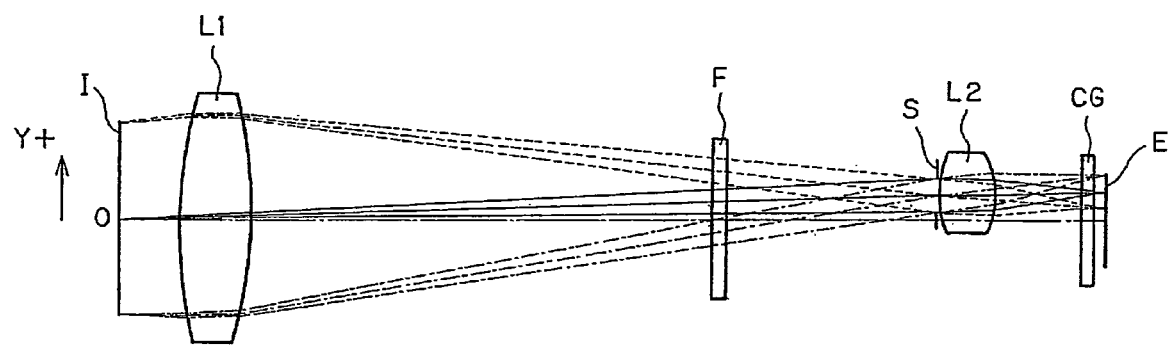
FIG. 13 is illustrative of the definition of an aberration diagram.

Aberration diagrams for Examples 1 to 6 are presented in FIGS. 7 to 12. Ordinate with astigmatism, distortion and chromatic aberration of magnification is indicative of a height at the predetermined imaging plane I, as shown in FIG. 13.

Example 1

| Surface | r | d | nd | vd |
|---|---|---|---|---|
| 1 | ∞ | 3.00 | | |
| 2 | 28.086 (aspheric) | 3.52 | 1.52542 | 55.78 |
| 3 | −26.518 | 0.30 | | |
| 4 | ∞ | 0.70 | 1.51633 | 64.14 |
| 5 | ∞ | 32.97 | | |
| 6 | ∞ (stop) | 0.16 | | |
| 7 | 6.592 | 2.74 | 1.52542 | 55.78 |
| 8 | −4.158 | 4.16 | | |
| 9 | ∞ | 0.70 | 1.52310 | 54.49 |
| 10 | ∞ | 0.62 | | |
| image plane | ∞ | | | | aspheric coefficient
second surface

| K = | −3.053 |
|---|---| quantity of decentration

| Surface | quantity of decentration |
|---|---|
| 6 | 1.246 |
| 7 | 1.602 |
| 8 | 1.180 |

Example 2

| Surface | r | d | nd | vd |
|---|---|---|---|---|
| 1 | ∞ | 3.00 | | |
| 2 | ∞ | 0.70 | 1.51633 | 64.14 |
| 3 | ∞ | 0.50 | | |
| 4 | 27.549 (aspheric) | 3.50 | 1.52542 | 55.78 |
| 5 | −27.230 | 34.23 | | |
| 6 | ∞ (stop) | 0.16 | | |
| 7 | 6.553 | 3.20 | 1.58313 | 59.38 |
| 8 | 4.913 | 3.99 | | |
| 9 | ∞ | 0.70 | 1.52310 | 54.49 |
| 10 | ∞ | 0.62 | | |
| image plane | ∞ | | | | aspheric coefficient
second surface

| K = | −3.858 |
|---|---| quantity of decentration

| Surface | quantity of decentration |
|---|---|
| 6 | 1.251 |
| 7 | 1.584 |
| 8 | 1.171 |

Example 3

| Surface | r | d | nd | vd |
|---|---|---|---|---|
| 1 | ∞ | 3.00 | | |
| 2 | 25.361 (aspheric) | 3.54 | 1.49236 | 57.86 |
| 3 | −23.590 | 22.88 | | |
| 4 | ∞ | 0.70 | 1.51633 | 64.14 |
| 5 | ∞ | 8.63 | | |
| 6 | ∞ (stop) | 0.16 | | |
| 7 | 10.596 | 2.90 | 1.52542 | 55.78 |
| 8 | −4.647 | 6.05 | | |
| 9 | ∞ | 0.70 | 1.52310 | 54.49 |
| 10 | ∞ | 0.62 | | |
| image plane | ∞ | | | | aspheric coefficient
second surface

| K = | −4.840 |
|---|---| quantity of decentration

| Surface | quantity of decentration |
|---|---|
| 6 | 1.191 |
| 7 | 1.699 |
| 8 | 1.119 |

Example 4

| Surface | r | d | nd | vd |
|---|---|---|---|---|
| 1 | ∞ | 3.00 | | |
| 2 | 18.079 (aspheric) | 3.51 | 1.52542 | 55.78 |
| 3 | −23.215 | 0.30 | | |
| 4 | ∞ | 0.70 | 1.51633 | 64.14 |
| 5 | ∞ | 22.20 | | |
| 6 | ∞ (stop) | 0.16 | | |
| 7 | 6.498 | 2.13 | 1.52542 | 55.78 |
| 8 | −3.149 | 3.42 | | |
| 9 | ∞ | 0.70 | 1.52310 | 54.49 |
| 10 | ∞ | 0.62 | | |
| image plane | ∞ | | | |

-continued aspheric coefficient
second surface

| K = | −2.449 | quantity of decentration

| Surface | quantity of decentration |
|---|---|
| 6 | 0.868 |
| 7 | 1.212 |
| 8 | 0.825 |

Example 5

| Surface | r | d | nd | vd |
|---|---|---|---|---|
| 1 | ∞ | 3.00 | | |
| 2 | ∞ | 0.70 | 1.51633 | 64.14 |
| 3 | ∞ | 0.50 | | |
| 4 | 17.821 (aspheric) | 3.46 | 1.52542 | 55.78 |
| 5 | −23.629 | 22.81 | | |
| 6 | ∞ (stop) | 0.14 | | |
| 7 | 7.206 | 2.26 | 1.58313 | 59.38 |
| 8 | −3.453 | 3.35 | | |
| 9 | ∞ | 0.70 | 1.52310 | 54.49 |
| 10 | ∞ | 0.62 | | |
| image plane | ∞ | | | | aspheric coefficient
second surface

| K = | −2.231 | quantity of decentration

| Surface | quantity of decentration |
|---|---|
| 6 | 0.857 |
| 7 | 1.227 |
| 8 | 0.807 |

Example 6

| Surface | r | d | nd | vd |
|---|---|---|---|---|
| 1 | ∞ | 3.00 | | |
| 2 | ∞ | 0.70 | 1.51633 | 64.14 |
| 3 | ∞ | 0.50 | | |
| 4 | 18.306 (aspheric) | 3.53 | 1.52542 | 55.78 |
| 5 | −23.130 | 22.99 | | |
| 6 | ∞ (stop) | 0.16 | | |
| 7 | 13.440 | 1.96 | 1.58313 | 59.38 |
| 8 | −3.405 | 4.28 | | |
| 9 | ∞ | 0.70 | 1.52310 | 54.49 |
| 10 | ∞ | 0.62 | | |
| image plane | ∞ | | | |

-continued aspheric coefficient
second surface

| K = | −2.382 | quantity of decentration

| Surface | quantity of decentration |
|---|---|
| 6 | 0.862 |
| 7 | 1.499 |
| 8 | 0.808 |

One exemplary lens interchangeable type single-lens reflex camera is now explained as a typical imaging apparatus using such a focus detection optical system.

Figure 14:
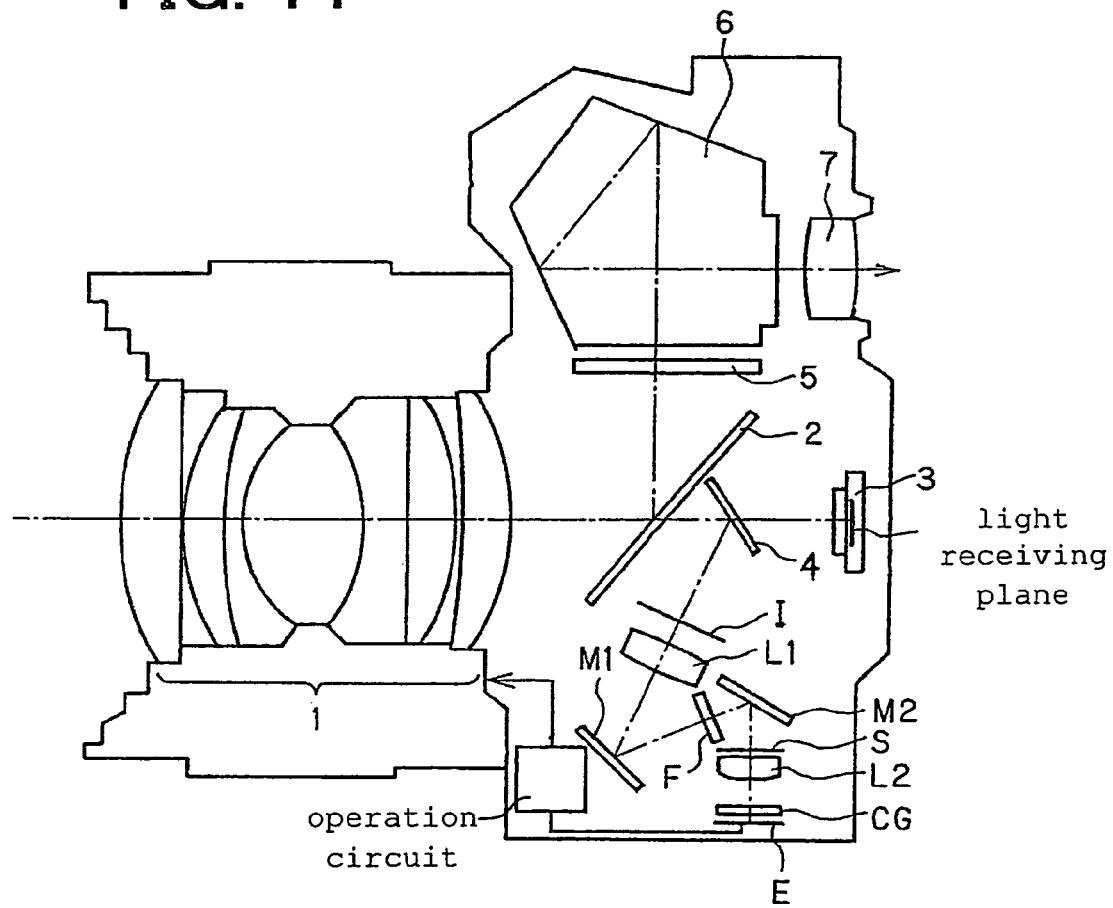
FIG. 14 is illustrative in schematic of the setup of a single-lens reflex type digital camera with the focus detection optical system according to Example 7 of the invention mounted on it.
Figure 15B:
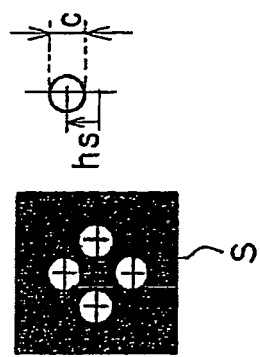
FIG. 15(*a*) is a perspective view of part of the focus detection optical system of FIG. 14, FIG. 15(*b*) is a top view showing the setup of the aperture stop, and FIG. 15(*c*) is a perspective view showing the setup of the re-imaging lens.
Figure 15C:
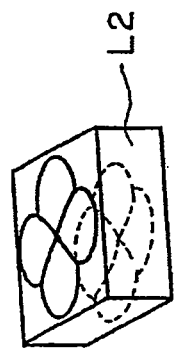
Figure 15A:
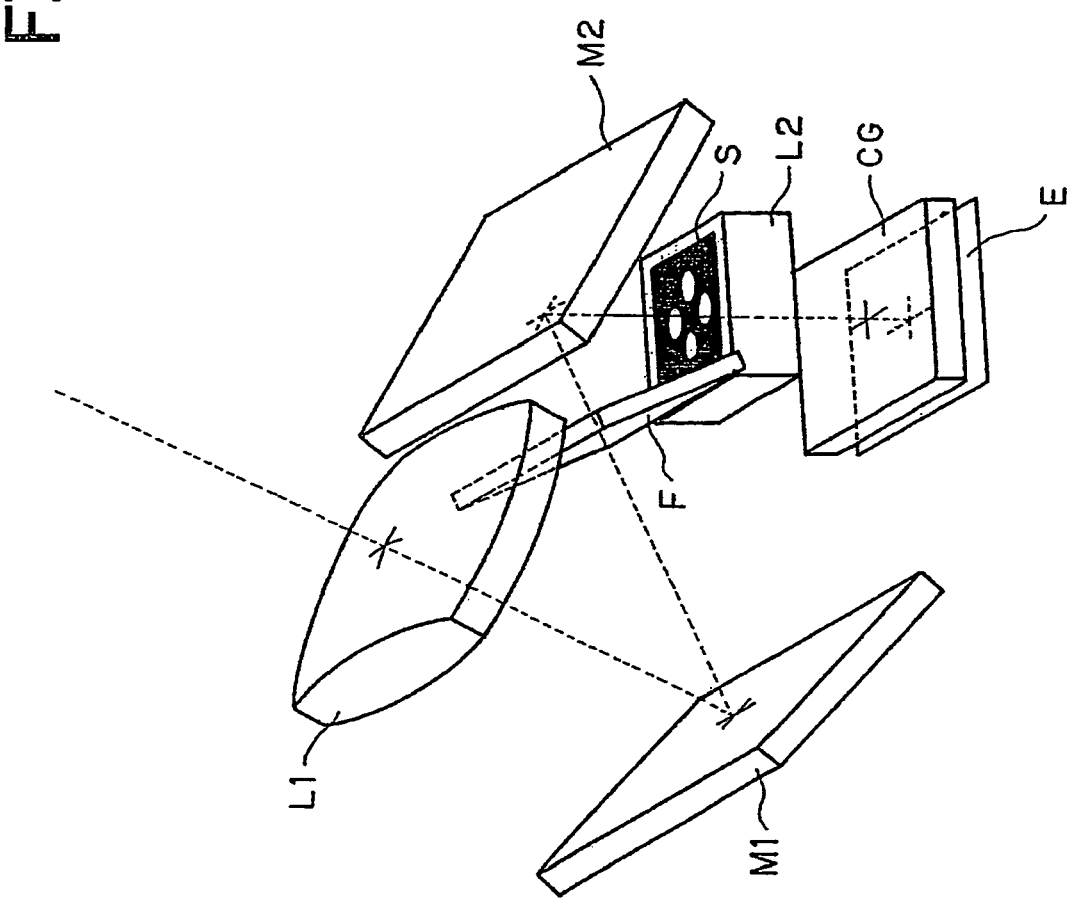
Figure 16:
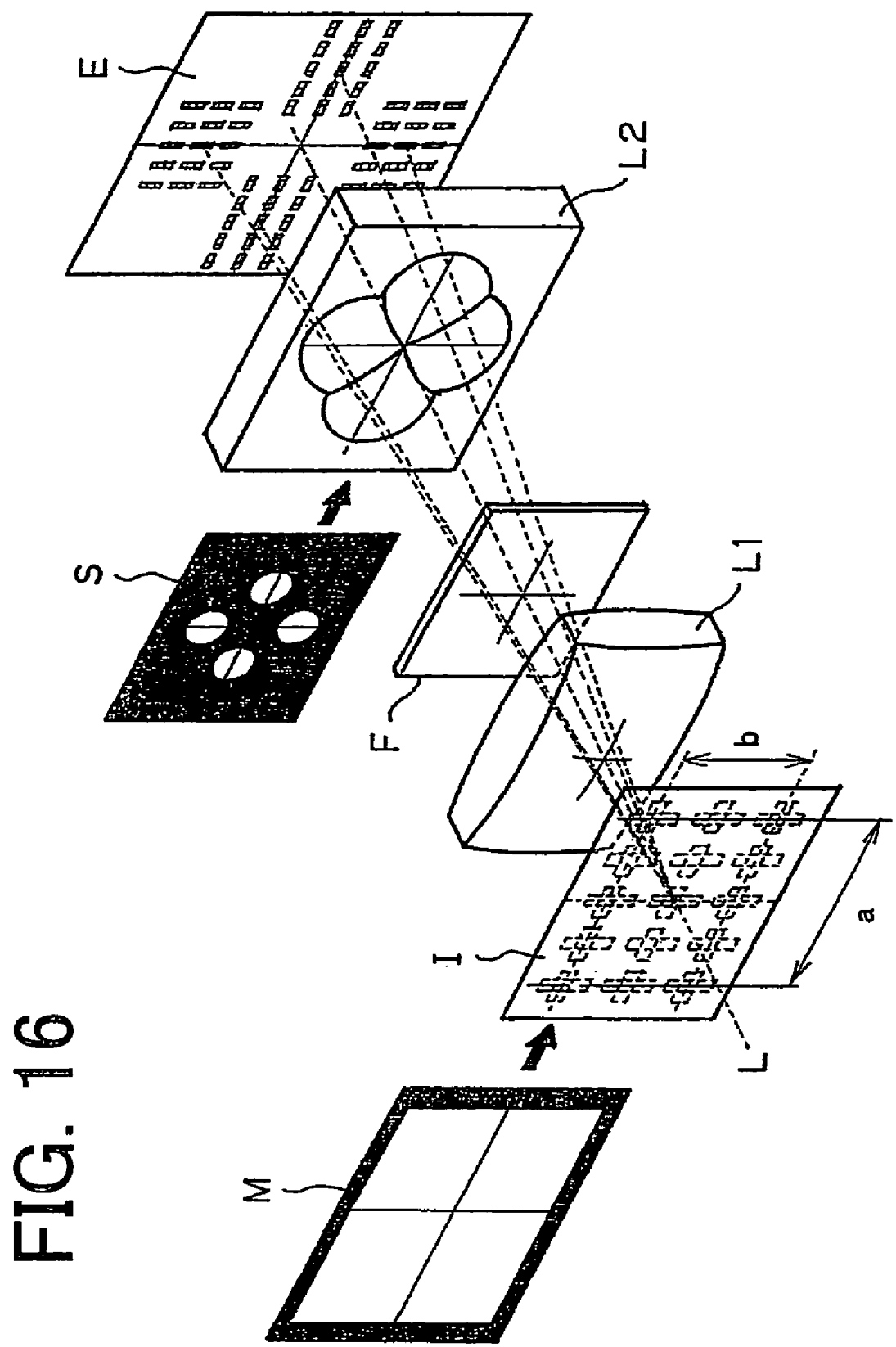
FIG. 16 is a taken-away schematic view of the focus detection optical system of FIG. 14 from which a bending mirror is removed.

FIG. 14 is illustrative in schematic of the setup of a single-lens reflex type digital camera with the focus detection optical system of the invention mounted on it. FIG. 15(a) is a perspective view of part of the focus detection optical system of FIG. 14, FIG. 15(b) is a top view showing the setup of the aperture stop, and FIG. 15(c) is a perspective view showing the setup of the re-imaging lens. FIG. 16 is a taken-away schematic view of the focus detection optical system of FIG. 14 from which a bending mirror is removed.

As shown in FIG. 14, the camera here comprises an imaging optical system, a finder optical system and a focus detection optical system.

The imaging optical system is built up of, in order of its optical path, a taking lens 1, a half-mirror 2, and a reflecting mirror 4.

The taking lens 1 is attachable or detachable to the camera body via a mount. The half-mirror 2 is set up such that an optical path from the taking lens 1 is split into a direction toward an imaging device 3 and a finder optical system direction. The half-mirror 2 is also built up of a quick return mirror that ascends in operable association with a shutter (not shown).

The reflecting mirror 4 is set up in such a way as to guide light form the taking lens 1 to the focus detection optical system. The reflecting mirror 4 is also constructed in such a way as to ascend in operable association with the half-mirror 2; as it ascends, it is off the optical path so that light from the taking lens 1 is guided to the light receiving plane of the imaging device 3. More specifically, the optical path from the taking image 1 can be switched over to the imaging device direction or the focus detection optical system direction.

As shown in FIG. 14, the focus detection optical system is built up of a condenser lens L1 located near a predetermined imaging plane I equivalent to a light receiving plane that becomes the imaging plane of the taking lens 1, reflecting mirrors M1 and M2 adapted to reflect light from the condenser lens L1 to compactly receive it in the camera body, an aperture stop S having a pair of openings in the vertical, and the horizontal direction, a re-imaging lens L2 having a pair of double-convex lenses in the vertical, and the horizontal direction corresponding to the respective openings in the aperture stop S wherein said double-convex lenses are configured as an integral unit, and a light receptor element array E.

For the arrangement of the focus detection optical system, the one in the aforesaid Example 1 is used but, of course, other examples may just as well be used.

Figure 17B:
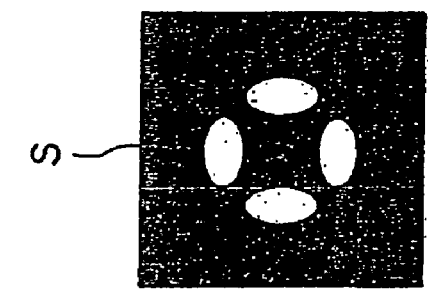
FIG. 17(*a*)-(*b*) is illustrative of a modification to the aperture stop.
Figure 17A:
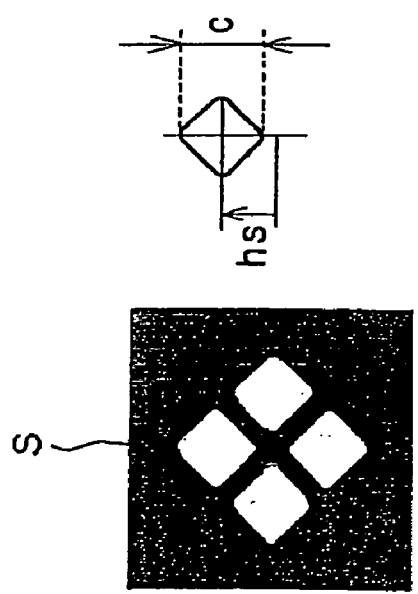

The openings in the aperture stop S may be configured either as shown in FIG. 15(b) or as shown in FIGS. 17(a) and 17(b).

The finder optical system is built up of a screen 5 located at the predetermined imaging plane equivalent to the taking lens on an optical path taken by light reflected at the half-mirror 2, a penta roof prism 6, and an eyepiece lens 7.

Besides, the camera here comprises a display device such as an LCD inherent in a digital camera, a memory device for recording images, an infrared cut filter, and so on, although not shown.

In the thus constructed digital camera here, light from the taking lens 1 enters the half-mirror 2. Light reflected at the half-mirror 2 is viewed with the naked eye through the finder optical system. Light transmitting through the half-mirror 2 is reflected at a reflecting mirror 4 to implement focus detection operation in response to a signal coming from a rangefinder supporting switch provided at a shutter button (not shown).

A signal about the intensity distribution of a pair of secondary object images obtained through the light receptor element array is sent out to an operation circuit where the focus position of the taking lens is worked out of the relative position relation between two such images to forward a signal indicative of focusing operation to a driver portion (not shown) for the taking lens, thereby letting it implement focusing operation.

At the time of exposure, the reflecting mirror 4 ascends in operable association with the half-mirror 2, and is off the optical path through the taking optical system, so that light is received at the light receiving plane of the imaging device 3.

For the light receptor element array in the focus detection optical system, CCDs (solid-state image sensors), CMOS sensors, etc. may be used. In that case, the light receptor elements may be lined up either one-dimensionally or two-dimensionally; in view of cost performance, however, it is preferable to use one-dimensionally lined-up light receptor elements.

Although the focus detection optical system of the invention is preferable for use with cameras using an imaging device, it is understood that it may also be applied to cameras using films.

What is claimed is:

1. A focus detection optical system, comprising:
    a condenser lens located near a predetermined imaging plane of a taking lens,
    a pupil division optical system that is located on an exit side of said condenser lens and divides a pupil of said taking lens into two pupil areas to form a pair of secondary object images with light beams passing through said pupil areas, and a light receptor element array that is located on a side of said pair of secondary object images of said pupil division optical system, so that a relative position relation between said pair of secondary object images received at said light receptor element array is detected to detect a focus position of said taking lens, wherein:
    said pupil division optical system comprises an aperture stop having a pair of openings with an optical axis of said taking lens held between them, and
    a pair of re-imaging lenses, each consisting of a double-convex lens having a convex entrance-side surface and a convex exit-side surface, wherein:
    when, on a plane passing through the optical axis of said taking lens and centers of gravity of the openings in said aperture stop, a surface apex is defined by a position of said convex entrance-side surface, and said convex exit-side surface, which position is extended most in a direction parallel with the optical axis of said taking lens, surface apexes of said entrance-side surface and said exit-side surface of said double-convex lens are positioned away from the optical axis of said taking lens in the same direction, and a distance of the surface apex of said entrance-side surface from the optical axis of said taking lens is larger than a distance of the surface apex of said exit-side surface from the optical axis of said taking lens.

2. The focus detection optical system according to claim 1, which satisfies the following condition:

$$0.40 < h4/h3 < 0.90 \quad (1)$$

where h3 is a quantity of decentration of the surface apex of the entrance-side surface of the re-imaging lens with respect to the optical axis of the taking lens, and
    h4 is a quantity of decentration of the surface apex of the exit-side surface of the re-imaging lens with respect to the optical axis of the taking lens, provided that h3 and h4 indicative of the quantities of decentration of the entrance- and exit-side surfaces of the re-imaging lens are supposed to have a plus sign in the same direction as a direction of decentration of centers of gravity of the openings in the aperture stop corresponding to the re-imaging lens.

3. The focus detection optical system according to claim 2, wherein said aperture stop is located just before the entrance-side surface of the re-imaging lens with satisfaction of the following condition:

$$0.75 < h4/hs \quad (3)$$

where hs is a quantity of decentration of the centers of gravity of the openings in the aperture stop with respect to the optical axis of the taking lens, and
    h4 is a quantity of decentration of the surface apex of the exit-side surface of the re-imaging lens with respect to the optical axis of the taking lens, provided that h4 indicative of the quantity of decentration of the exit-side surface of the re-imaging lens is supposed to have a plus sign in the same direction as a direction of decentration of centers of gravity of the openings in the aperture stop corresponding to the re-imaging lens.

4. The focus detection optical system according to claim 3, which satisfies the following condition:

$$0.10 < |mg| < 0.30 \quad (4)$$

where mg is a d-line imaging magnification of the focus detection optical system.

5. The focus detection optical system according to claim 4, which satisfies the following condition:

$$-1.50 < R2/R1 < -0.75 \quad (5)$$

where R1 is a paraxial radius of curvature of the entrance-side surface of the condenser lens, and
    R2 is a paraxial radius of curvature of the exit-side surface of the condenser lens.

6. The focus detection optical system according to claim 5, which satisfies the following condition:

$$-0.90 < R4/R3 < -0.10 \quad (6)$$

where R3 is a radius of curvature of the entrance-side surface of the re-imaging lens at the surface apex, and
    R4 is a radius of curvature of the exit-side surface of the re-imaging lens at the surface apex.

7. The focus detection optical system according to claim 4, which satisfies the following condition:

$$-0.90 < R4/R3 < -0.10 \quad (6)$$

where R3 is a radius of curvature of the entrance-side surface of the re-imaging lens at the surface apex, and R4 is a radius of curvature of the exit-side surface of the re-imaging lens at the surface apex.

8. The focus detection optical system according to claim 3, which satisfies the following condition:

$$-1.50 < R2/R1 < -0.75 \qquad (5)$$

where R1 is a paraxial radius of curvature of the entrance-side surface of the condenser lens, and R2 is a paraxial radius of curvature of the exit-side surface of the condenser lens.

9. The focus detection optical system according to claim 8, which satisfies the following condition:

$$-1.50 < R2/R1 < -0.75 \qquad (5)$$

where R1 is a paraxial radius of curvature of the entrance-side surface of the condenser lens, and R2 is a paraxial radius of curvature of the exit-side surface of the condenser lens.

10. The focus detection optical system according to claim 9, which satisfies the following condition:

$$-0.90 < R4/R3 < -0.10 \qquad (6)$$

where R3 is a radius of curvature of the entrance-side surface of the re-imaging lens at the surface apex, and R4 is a radius of curvature of the exit-side surface of the re-imaging lens at the surface apex.

11. The focus detection optical system according to claim 8, which satisfies the following condition:

$$-0.90 < R4/R3 < -0.10 \qquad (6)$$

where R3 is a radius of curvature of the entrance-side surface of the re-imaging lens at the surface apex, and R4 is a radius of curvature of the exit-side surface of the re-imaging lens at the surface apex.

12. The focus detection optical system according to claim 3, which satisfies the following condition:

$$-0.90 < R4/R3 < -0.10 \qquad (6)$$

where R3 is a radius of curvature of the entrance-side surface of the re-imaging lens at the surface apex, and R4 is a radius of curvature of the exit-side surface of the re-imaging lens at the surface apex.

13. An imaging apparatus, comprising:
an imaging device adapted to take an image formed by a taking lens,
a focus detection optical system as recited in claim 3, and
a reflective member adapted to reflect a light beam from the taking lens and guide the light beam to a predetermined imaging plane, wherein:
said reflective member retracts out of a taking optical path as an image is taken by the imaging device.

14. An imaging apparatus, comprising:
an imaging device adapted to take an image formed by a taking lens,
a focus detection optical system as recited in claim 3, and
a reflective member adapted to reflect and transmit a light beam from the taking lens, wherein:
the imaging device is located on one of a reflective or transmissive side of the reflective member, and said focus detection optical system is located on the other.

15. The focus detection optical system according to claim 2, wherein said aperture stop is located just before the entrance-side surface of the re-imaging lens with satisfaction of the following conditions:

$$1.10 < h3/hs < 1.90 \qquad (2)$$

$$0.75 < h4/hs < 1.10 \qquad (3\text{-}1)$$

where hs is a quantity of decentration of the centers of gravity of the openings in the aperture stop with respect to the optical axis of the taking lens, h3 is a quantity of decentration of the surface apex of the entrance-side surface of the re-imaging lens with respect to the optical axis of the taking lens, and h4 is a quantity of decentration of the surface apex of the exit-side surface of the re-imaging lens with respect to the optical axis of the taking lens, provided that h3 and h4 indicative of the quantities of decentration of the entrance- and exit-side surfaces of the re-imaging lens are supposed to have a plus sign in the same direction as the direction of decentration of centers of gravity of the openings in the aperture stop corresponding to the re-imaging lens.

16. The focus detection optical system according to claim 15, which satisfies the following condition:

$$10 < |mg| < 0.30 \qquad (4)$$

where mg is a d-line imaging magnification of the focus detection optical system.

17. The focus detection optical system according to claim 16, which satisfies the following condition:

$$-1.50 < R2/R1 < -0.75 \qquad (5)$$

where R1 is a paraxial radius of curvature of the entrance-side surface of the condenser lens, and R2 is a paraxial radius of curvature of the exit-side surface of the condenser lens.

18. The focus detection optical system according to claim 17, which satisfies the following condition:

$$-0.90 < R4/R3 < -0.10 \qquad (6)$$

where R3 is a radius of curvature of the entrance-side surface of the re-imaging lens at the surface apex, and R4 is a radius of curvature of the exit-side surface of the re-imaging lens at the surface apex.

19. The focus detection optical system according to claim 16, which satisfies the following condition:

$$-0.90 < R4/R3 < -0.10 \qquad (6)$$

where R3 is a radius of curvature of the entrance-side surface of the re-imaging lens at the surface apex, and R4 is a radius of curvature of the exit-side surface of the re-imaging lens at the surface apex.

20. The focus detection optical system according to claim 15, which satisfies the following condition:

$$-1.50 < R2/R1 < -0.75 \qquad (5)$$

where R1 is a paraxial radius of curvature of the entrance-side surface of the condenser lens, and R2 is a paraxial radius of curvature of the exit-side surface of the condenser lens.

21. The focus detection optical system according to claim 20, which satisfies the following condition:

$$-0.90 < R4/R3 < -0.10 \qquad (6)$$

where R3 is a radius of curvature of the entrance-side surface of the re-imaging lens at the surface apex, and R4 is a radius of curvature of the exit-side surface of the re-imaging lens at the surface apex.

22. The focus detection optical system according to claim 15, which satisfies the following condition:

$$-0.90 < R4/R3 < -0.10 \quad (6)$$

where R3 is a radius of curvature of the entrance-side surface of the re-imaging lens at the surface apex, and R4 is a radius of curvature of the exit-side surface of the re-imaging lens at the surface apex.

23. The focus detection optical system according to claim 2, which satisfies the following condition:

$$0.10 < |mg| < 0.30 \quad (4)$$

where mg is a d-line imaging magnification of the focus detection optical system.

24. The focus detection optical system according to claim 2, which satisfies the following condition:

$$-1.50 < R2/R1 < -0.75 \quad (5)$$

where R1 is a paraxial radius of curvature of the entrance-side surface of the condenser lens, and R2 is a paraxial radius of curvature of the exit-side surface of the condenser lens.

25. The focus detection optical system according to claim 24, which satisfies the following condition:

$$-1.50 < R2/R1 < -0.75 \quad (5)$$

where R1 is a paraxial radius of curvature of the entrance-side surface of the condenser lens, and R2 is a paraxial radius of curvature of the exit-side surface of the condenser lens.

26. The focus detection optical system according to claim 25, which satisfies the following condition:

$$-0.90 < R4/R3 < -0.10 \quad (6)$$

where R3 is a radius of curvature of the entrance-side surface of the re-imaging lens at the surface apex, and R4 is a radius of curvature of the exit-side surface of the re-imaging lens at the surface apex.

27. The focus detection optical system according to claim 24, which satisfies the following condition:

$$-0.90 < R4/R3 < -0.10 \quad (6)$$

where R3 is a radius of curvature of the entrance-side surface of the re-imaging lens at the surface apex, and R4 is a radius of curvature of the exit-side surface of the re-imaging lens at the surface apex.

28. The focus detection optical system according to claim 2, which satisfies the following condition:

$$-0.90 < R4/R3 < -0.10 \quad (6)$$

where R3 is a radius of curvature of the entrance-side surface of the re-imaging lens at the surface apex, and R4 is a radius of curvature of the exit-side surface of the re-imaging lens at the surface apex.

29. An imaging apparatus, comprising:

an imaging device adapted to take an image formed by a taking lens, a focus detection optical system as recited in claim 2, and a reflective member adapted to reflect a light beam from the taking lens and guide the light beam to a predetermined imaging plane, wherein:

said reflective member retracts out of a taking optical path as an image is taken by the imaging device.

30. An imaging apparatus, comprising:

an imaging device adapted to take an image formed by a taking lens, a focus detection optical system as recited in claim 2, and a reflective member adapted to reflect and transmit a light beam from the taking lens, wherein:

the imaging device is located on one of a reflective or transmissive side of the reflective member, and said focus detection optical system is located on the other.

31. The focus detection optical system according to claim 1, which satisfies the following condition:

$$0.60 < h4/h3 < 0.85 \quad (1\text{-}1)$$

where h3 is a quantity of decentration of the surface apex of the entrance-side surface of the re-imaging lens with respect to the optical axis of the taking lens, and h4 is a quantity of decentration of the surface apex of the exit-side surface of the re-imaging lens with respect to the optical axis of the taking lens, provided that h3 and h4 indicative of the quantities of decentration of the entrance- and exit-side surface of the re-imaging lens are supposed to have a plus sign in the same direction as the direction of decentration of centers of gravity of the openings in the aperture stop corresponding to the re-imaging lens.

32. The focus detection optical system according to claim 1, wherein said aperture stop is located just before the entrance-side surface of the re-imaging lens with satisfaction of the following condition:

$$0.75 < h4/hs \quad (3)$$

where hs is a quantity of decentration of the centers of gravity of the openings in the aperture stop with respect to the optical axis of the taking lens, and h4 is a quantity of decentration of the surface apex of the exit-side surface of the re-imaging lens with respect to the optical axis of the taking lens, provided that h4 indicative of the quantity of decentration of the exit-side surface of the re-imaging lens is supposed to have a plus sign in the same direction as a direction of decentration of centers of gravity of the openings in the aperture stop corresponding to the re-imaging lens.

33. The focus detection optical system according to claim 1, wherein said aperture stop is located just before the entrance-side surface of the re-imaging lens with satisfaction of the following conditions:

$$1.10 < h3/hs < 1.90 \quad (2)$$

$$0.75 < h4/hs < 1.10 \quad (3\text{-}1)$$

where hs is a quantity of decentration of the centers of gravity of the openings in the aperture stop with respect to the optical axis of the taking lens, h3 is a quantity of decentration of the surface apex of the entrance-side surface of the re-imaging lens with respect to the optical axis of the taking lens, and h4 is a quantity of decentration of the surface apex of the exit-side surface of the re-imaging lens with respect to the optical axis of the taking lens, provided that h3 and h4 indicative of the quantities of decentration of the entrance- and exit-side surfaces of the re-imaging lens are supposed to have a plus sign in the same direction as the direction of decentration of centers of gravity of the openings in the aperture stop corresponding to the re-imaging lens.

34. An imaging apparatus, comprising:

an imaging device adapted to take an image formed by a taking lens, a focus detection optical system as recited in claim 1, and a reflective member adapted to reflect a light beam from the taking lens and guide the light beam to a predetermined imaging plane, wherein:

said reflective member retracts out of a taking optical path as an image is taken by the imaging device.

35. An imaging apparatus, comprising:

an imaging device adapted to take an image formed by a taking lens, a focus detection optical system as recited in claim 1, and a reflective member adapted to reflect and transmit a light beam from the taking lens, wherein:

the imaging device is located on one of a reflective or transmissive side of the reflective member, and said focus detection optical system is located on the other.

* * * * *